United States Patent
Joshi

(10) Patent No.: US 10,944,991 B2
(45) Date of Patent: Mar. 9, 2021

(54) PREDICTION FOR MATCHED PATCH INDEX CODING

(71) Applicant: Samsung Electronics Co., Ltd., Suwon-si (KR)

(72) Inventor: Rajan Laxman Joshi, San Diego, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/590,225

(22) Filed: Oct. 1, 2019

(65) Prior Publication Data

US 2020/0112745 A1   Apr. 9, 2020

Related U.S. Application Data

(60) Provisional application No. 62/740,671, filed on Oct. 3, 2018, provisional application No. 62/808,505, filed (Continued)

(51) Int. Cl.
  *H04N 19/597*   (2014.01)
  *H04N 19/172*   (2014.01)
  (Continued)

(52) U.S. Cl.
  CPC ......... *H04N 19/597* (2014.11); *H04N 13/161* (2018.05); *H04N 13/275* (2018.05);
  (Continued)

(58) Field of Classification Search
  None
  See application file for complete search history.

(56) References Cited

U.S. PATENT DOCUMENTS 5,748,199 A * 5/1998 Palm ................... H04N 13/133
                                                  345/473
9,215,468 B1 * 12/2015 Faroudja ............... H04N 19/53
(Continued)

FOREIGN PATENT DOCUMENTS

KR   10-2015-0027731 A   3/2015

OTHER PUBLICATIONS

ISA/KR, International Search Report and Written Opinion of the International Searching Authority, International Application No. PCT/KR2019/012948, dated Jan. 22, 2020, 8 pages.

(Continued)

*Primary Examiner* — Frederick D Bailey

(57) ABSTRACT

A decoding device, an encoding device and methods for point cloud encoding and decoding are disclosed. The method for decoding includes receiving a bitstream and decoding from the bit stream a first and second frame that is associated with a delta index. The first and second frames include patches that represent a 3D point cloud at different instances in time. The method additionally includes determining, based on decoding the delta index, that at least one of the patches included in the second frame matches a corresponding patch included in the first frame. The method further includes identifying a predictor index for a current patch; identifying a reference index associated with a reference patch in the first frame based on the delta index and the predictor index; and generating the 3D point cloud using the first frame, the second frame, and the reference patch.

20 Claims, 10 Drawing Sheets

Related U.S. Application Data on Feb. 21, 2019, provisional application No. 62/866,038, filed on Jun. 25, 2019.

(51) Int. Cl.
*H04N 19/105* (2014.01)
*H04N 19/137* (2014.01)
*H04N 13/275* (2018.01)
*H04N 13/161* (2018.01)

(52) U.S. Cl.
CPC ......... *H04N 19/105* (2014.11); *H04N 19/137* (2014.11); *H04N 19/172* (2014.11)

(56) References Cited

U.S. PATENT DOCUMENTS

| | | |
|---|---|---|
| 9,743,103 B1 | 8/2017 | Maaninen |
| 10,057,570 B2 | 8/2018 | Ye et al. |
| 2016/0205409 A1 | 7/2016 | Park et al. |
| 2017/0347120 A1 | 11/2017 | Chou et al. |
| 2018/0270479 A1* | 9/2018 | Chen ............... H04N 19/119 |
| 2019/0180459 A1* | 6/2019 | Shi ................... G06K 9/6202 |
| 2019/0313110 A1* | 10/2019 | Mammou ........... H04N 19/20 |

OTHER PUBLICATIONS

Xu, Yiling, et al., "Introduction to Point Cloud Compression," ZTE Communications, vol. 16, No. 3, Aug. 24, 2018, 8 pages.

"Continuous improvement of Study Text of ISO/IEC CD 23090-5 Video-based Point Cloud Compression," ISO/IEC JTC1/SC29 WG11 Doc. N18479, Geneva, CH, Mar. 2019, 140 pages.

Joshi, "[V-PCC] [New proposal] On delta coding of patch information", ISO/IEC JTC1/SC29/WG11 MPEG2018/m44854, Oct. 2018, 4 pages.

* cited by examiner

PREDICTION FOR MATCHED PATCH INDEX CODING

CROSS-REFERENCE TO RELATED APPLICATION AND CLAIM OF PRIORITY

This application claims priority under 35 U.S.C. § 119(e) to U.S. Provisional Patent Application No. 62/740,671 filed on Oct. 3, 2018, U.S. Provisional Patent Application No. 62/808,505 filed on Feb. 21, 2019, and U.S. Provisional Patent Application No. 62/866,038 filed on Jun. 25, 2019. The above-identified provisional patent applications are hereby incorporated by reference in its entirety.

TECHNICAL FIELD

This disclosure relates generally to multimedia data. More specifically, this disclosure relates to an apparatus and a method for compressing and decompressing point clouds.

BACKGROUND

Three hundred sixty degree (360°) video is emerging as a new way of experiencing immersive video due to the ready availability of powerful handheld devices such as smartphones. 360° video enables immersive "real life," "being there" experience for consumers by capturing the 360° view of the world. Users can interactively change their viewpoint and dynamically view any part of the captured scene or object they desire. Display and navigation sensors can track head movement of the user in real-time to determine the region of the 360° video that the user wants to view. Multimedia data that is three-dimensional (3D) in nature, such as point clouds are can be used in the immersive environment.

Point clouds are a set of 3D points that represent an objects surface. Point clouds are common in a variety of applications such as gaming, 3D maps, visualizations, medical applications, augmented reality, virtual reality, autonomous driving, multi-view replay, 6DoF immersive media, to name a few. Point clouds, if uncompressed, generally require a large amount of bandwidth for transmission. Due to the large bitrate requirement, point clouds are often compressed prior to transmission. To compress a 3D object such as a point cloud, often requires specialized hardware. To avoid specialized hardware to compress a 3D point cloud, a 3D point cloud can be manipulated onto traditional two-dimensional (2D) frames and that can be compressed and later be reconstructed and viewable to a user.

SUMMARY

This disclosure provides improving prediction for matched patch index coding.

In one embodiment, a decoding device for point cloud decoding is provided. The decoding device includes a communication interface configured to receive a compressed bitstream and a processor operably coupled to the communication interface. The processor is configured to decode, from the compressed bitstream, a first frame and a second frame that is associated with a delta index. The first frame and the second frame include patches that represent a three-dimensional (3D) point cloud at different instances in time. The processor is further configured to determine, based on decoding the delta index, that at least one of the patches included in the second frame match a corresponding patch included in the first frame; identify a current index of a current patch included in the second frame; identify a predictor index for the current patch; identify a reference index associated with a reference patch in the first frame based on the delta index and the predictor index. The reference patch matches the current patch. The processor is further configured to generate the 3D point cloud using the first frame, the second frame, and the reference patch.

In another embodiment, an encoding device for point cloud encoding is provided. The encoding device includes a processor configured to generate, for a three-dimensional (3D) point cloud, a first frame and a second frame that include patches representing a cluster of points of the 3D point cloud at different instances in time and identify a current index and a reference index, the current index corresponds to a current patch included in the second frame and the reference index corresponds to a reference patch included in the first frame. The current patch and the reference patch match. The processor is further configured to identify a predictor index for the current patch; generate a delta index based on the predictor index and the reference index; and encode the first frame, the second frame, and the delta index to generate a compressed bitstream. The encoding device further includes a communication interface operably coupled to the processor. The communication interface is configured to transmit the compressed bitstream.

In yet another embodiment, a method for point cloud decoding is provided. The method includes receiving a compressed bitstream and decoding, from the compressed bitstream, a first frame and a second frame that is associated with a delta index. The first frame and the second frame include patches that represent a three-dimensional (3D) point cloud at different instances in time. The method further includes determining, based on decoding the delta index, that at least one of the patches included in the second frame match a corresponding patch included in the first frame; identifying a current index of a current patch included in the second frame; identifying a predictor index for the current patch; and identifying a reference index associated with a reference patch in the first frame based on the delta index and the predictor index. The reference patch matches the current patch. The method further includes generating the 3D point cloud using the first frame, the second frame, and the reference patch.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
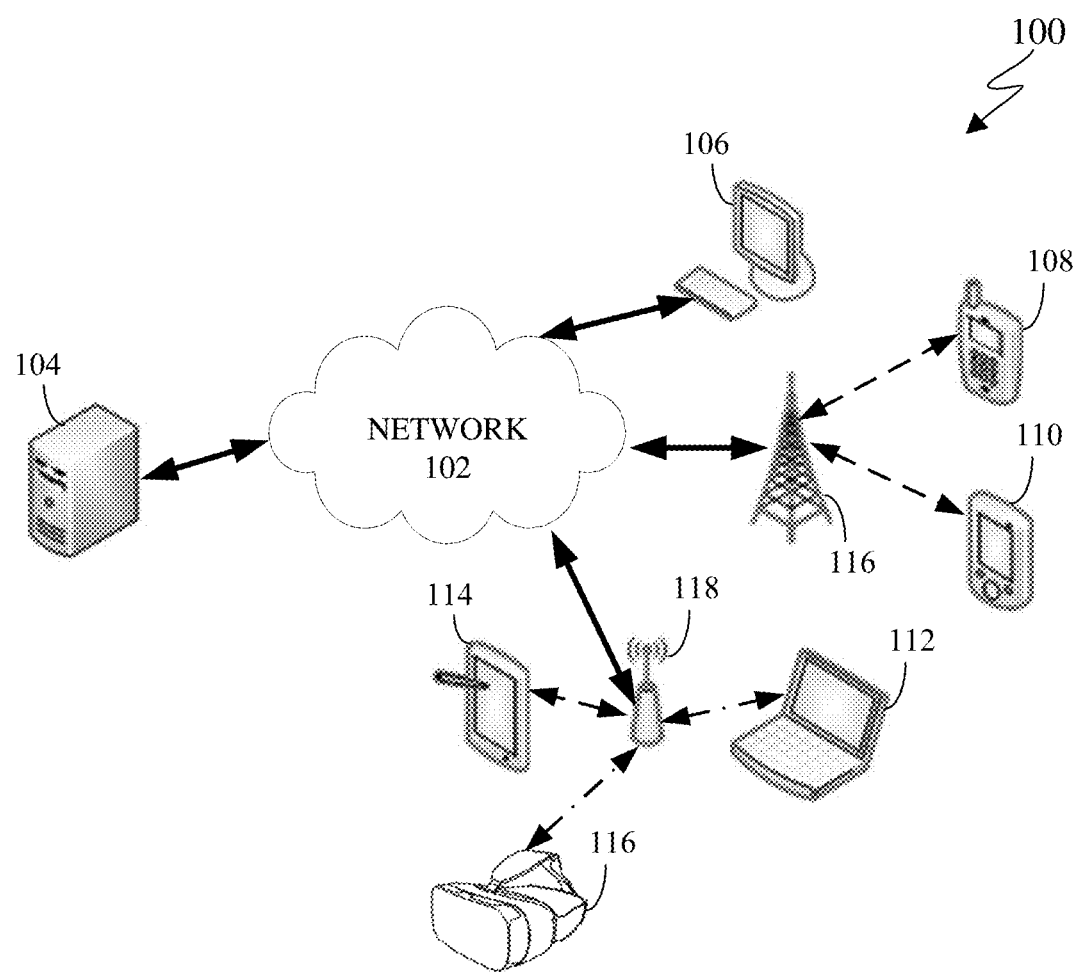
FIG. 1 illustrates an example communication system in accordance with an embodiment of this disclosure.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

Augmented reality (AR) is an interactive experience of a real world environment where objects that reside in the real-world environment are augmented with virtual objects, virtual information, or both. Virtual reality (VR) is a rendered version of a visual scene, where the entire scene is computer generated. In certain embodiments, AR and VR include both visual and audio experiences. A visual rendering is designed to mimic the visual stimuli, and if available audio sensory stimuli, of the real world as naturally as possible to an observer or user as the user moves within the limits defined by the application or the AR or VR scene. For example, VR places a user into immersive worlds that respond to the head movements of a user. At the video level, VR is achieved by providing a video experience that covers as much of the field of view (FOV) as possible together with the synchronization of the viewing angle of the rendered video with the head movements.

Many different types of devices are able to provide the immersive experience associated with AR or VR. One example device is a head-mounted display (HMD). A HMD is a device that enables a user to view the VR scene and adjust the displayed content based on movements of the head of the user. A HMD represent one of many types of devices that provide AR and VR experiences to a user. Typically, a HMD relies either on a dedicated screen that is integrated into a device and connected with an external computer (tethered) or on a device, such as a smartphone, that is inserted into the HMD (untethered). The first approach utilizes one or more lightweight screens and benefits from a high computing capacity. In contrast, the smartphone-based systems utilize higher mobility and can be less expensive to produce. In both instances, the video experience generated is the same. It is noted that as used herein, the term "user" may denote a human or another device (such as an artificial intelligent electronic device) using the electronic device.

A point cloud is a virtual representation of an object in three dimensions. For example, a point cloud is a collection of points in 3D space, and each point that is positioned in a particular position within 3D space and includes one or more attributes or textures. A point cloud can be similar to a virtual object in a VR or AR environment. A point mesh is another type of a virtual representation of an object in a VR or AR environment. A point cloud or a point mesh can be an object, multiple objects, a virtual scene (which includes multiple objects), and the like. Point clouds are commonly used in a variety of applications, including gaming, 3D mapping, visualization, medicine, AR, VR, autonomous driving, multi-view replay, 6 degrees of freedom immersive media, to name a few.

Point clouds represent volumetric visual data. In certain embodiments, the points are positioned on the external surface of the object. In certain embodiments, the points are positioned throughout the internal structure and external surfaces of the object. Point clouds consist of numerous points positioned in 3D space. Each point in a 3D point cloud includes an attribute such as a geometric position, represented by 3-tuple (X,Y,Z) coordinate values and can include one or more textures. The location of each point within in a 3D environment or space is identified by the three coordinates (X,Y,Z). Additionally, each point in the point cloud can also include additional textures such as color, reflectance, intensity, surface normal, and the like. A texture can refer to an attribute other than the geometry attribute. A single point of a 3D point cloud can have multiple attributes. For example, a first attribute can represent the geometric position of a point (such as a location of the point in 3D space), while a second attribute or texture can represent the color of the point, a third attribute or texture can represent the reflectiveness of the point, and yet the point can further include additional attributes or textures such as intensity, surface normal, and the like. In some embodiments, an attribute refers only to a texture of a point, and not a geometric position of the points. In some applications, point clouds can also be used to approximate light field data in which, each point includes multiple view-dependent, color information (R, G, B triplets).

A single point cloud can include billions of points, with each point associated with a geometric position and one or more attributes. A geometric position and each additional attribute that is associated with a point occupy a certain number of bits. For example, a geometric position of a single point in a point cloud can consume thirty bits. For instance, if each geometric position of a single point is defined with an X value, a Y value, and a Z value, then each coordinate (the X, the Y, and the Z) uses ten bits, totaling the thirty bits. Similarly, a texture corresponding to the color of a point cloud can consume twenty-four bits. For instance, if a color component of a single point is defined based on a Red value, Green value, and Blue value, then each color component (Red, Green, and Blue) uses eight bits, totaling the twenty-four bits. As a result, a single point with a ten bit geometric attribute data, per coordinate, and an eight bit color attribute data, per color value, occupies fifty-four bits. Each additional attribute increases the bits required for a single point. If a frame includes one million points, the number of bits per frame is fifty-four million bits (fifty-four bits per point times one million points per frame). If the frame rate is thirty frames per second and undergoes no compression, then 1.62 gigabytes per second (fifty-four million bits per frame times thirty frames per second) are to be transmitted from one electronic device to another in order for the second device to display the point cloud. Therefore, transmitting an uncompressed point cloud from one electronic device to another uses significant bandwidth due to the size and complexity of the data associated with a single point cloud. As a result, the point cloud is compressed prior to the transmission.

Embodiments of the present disclosure take into consideration that compressing a point clouds is necessary to expedite and improve transmission of the point cloud from one device (such as a source device) to another device (such as a display device) due to the bandwidth necessary to transmit the point cloud. Certain dedicated hardware components can be used to meet the real-time demands or reduce delays or lags in the transmitting and rendering a 3D point cloud; however such hardware components are often expensive. Additionally, many video codecs are not able to encode and decode 3D video content, such as a point cloud. Compressing and decompressing a point cloud by leveraging existing 2D video codecs enables the encoding and decoding of a point cloud to be widely available without the need for new or specialized hardware. According to embodiments of the present disclosure, leveraging existing video codecs can be used to compress and reconstruct a point cloud, when the point cloud is converted from a 3D state to a 2D state. In certain embodiments, the conversion of a point cloud includes projecting the clusters of points of the 3D point cloud onto 2D frames by creating patches that represent the point cloud. Thereafter, video codecs such as HEVC, AVC, VP9, VP8, JVNET, and the like can be used to compress the 2D frames representing the 3D point cloud similar to a 2D video.

Figure 4A:
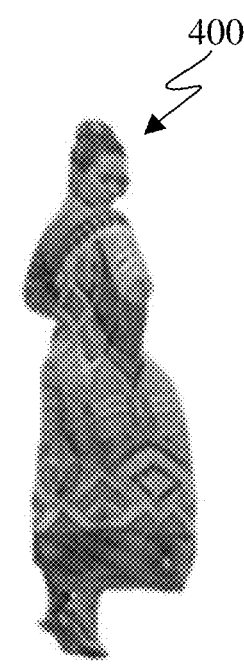
FIGS. 4A, 4B, and 4C illustrate an example 3D point cloud and 2D frames, that represent the 3D point cloud in accordance with an embodiment of this disclosure.
Figure 4B:
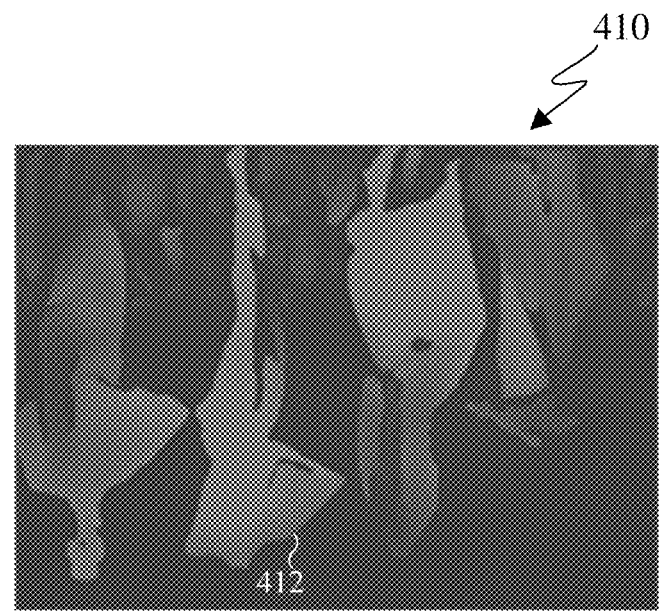
Figure 4C:
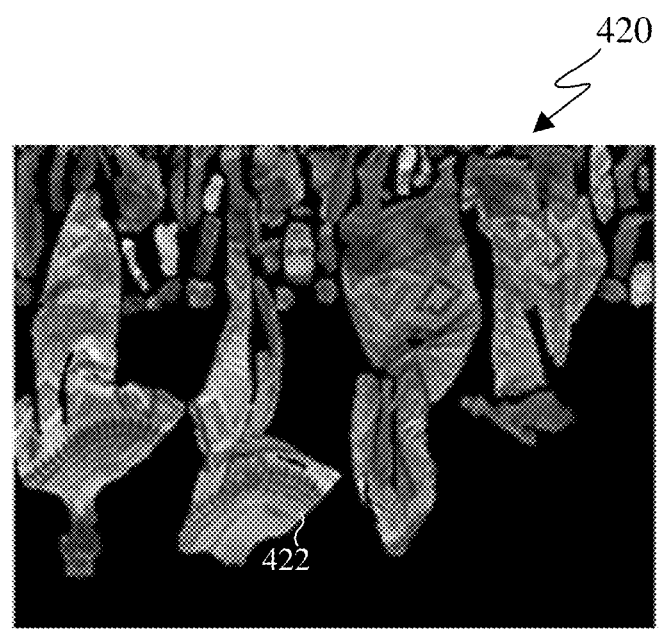

Converting the point cloud includes projecting the point cloud to generate multiple patches and packing the patches onto one or more 2D frames, such that the frames can be compressed, and then transmitted to a display device. Different frames can represent different attributes or textures of the point cloud, such as one frame includes values representing geometry positions of the points and another frame includes values representing color information associated with each of the points. A decoder reconstructs the patches within the 2D frames into the 3D point cloud, such that the point cloud can be rendered, displayed, and then viewed by a user. When the point cloud is deconstructed to fit on multiple 2D frames and compressed, the frames can be transmitted using less bandwidth than used to transmit the original point cloud. FIGS. 4A-4C, which are described in greater detail below, illustrate a 3D point cloud that is projected onto 2D frames by creating patches of the point cloud and two attributes.

Embodiments of the present disclosure provide systems and methods for converting a point cloud into a 2D state that can be transmitted and then reconstructed into the point cloud. In certain embodiments, a point cloud is deconstructed into multiple patches, and multiple frames are generated that include the patches. In certain embodiments, a frame includes patches of the same attributes. When a point cloud is deconstructed into multiple patches, auxiliary information is generated. The auxiliary information can indicate where each patch is located within a frame. The location of the patch within a frame referred to as an offset, as the location of a patch within a frame is offset from its original projection in order to pack more patches into a single frame. The auxiliary information can also indicate the size of the patch. The auxiliary information can further indicate where the patch belongs in 3D space.

During projection the encoder decomposes the point cloud into a set of patches by clustering the points. The geometry and texture information of these patches are packed into various frames. In certain embodiments, the geometry information is packed into a geometry frame and the texture information is packed into a texture frame. When attributes of a point are packed into separate frames, a mapping is generated between the pixels of one frame to the pixels of another frame. For example, the points of the 3D point cloud that are represented in one patch in one frame correspond to the same points that are represented in another patch in a second frame. In certain embodiments, the patches on one frame represent multiple attributes associated with the points of the point cloud, such as a geometric position of the points in 3D space and color.

Each pixel within a patch in the geometry video frame corresponds to a point in 3D space. The two transverse coordinates (with respect to the projection plane) of a 3D point corresponds to the column and row indices in the geometry video frame (u,v) plus a transverse-offset which determines the location of the entire patch within the video frame. The depth of the 3D point is encoded as the value of the pixel in the video frame. The transverse-offset can be included in auxiliary information that is included in the bitstream. The depth of the 3D point cloud depends on whether the projection of the 3D point cloud is taken from the XY, YZ, or XZ coordinates.

Projecting a point in 3D space, from a point cloud, onto 2D frames certain points of the 3D point cloud can be missed, and not included in any of the 2D frames. Thereafter, when the point cloud is reconstructed, by the decoder, cracks and holes can be introduced in the reconstructed could cloud, as certain points were not transmitted from the original 3D point cloud. A point is missed when it is not projected from 3D point cloud to a patch on a 2D video frame. Missed points generally occur near regions of high curvature in the point cloud surface or due to self-occlusions. Additionally, some isolated 3D points are not included in the regular patches as these points they fail to comply with the constraints imposed during the projection onto the 2D frames. For example, the constraints can include a maximum depth constraint, distance from other points in the neighborhood, and the like.

If two or more points are projected to the same pixel location, then one of those points can be missed. Since there could be multiple points being projected to the same pixel of a 2D frame, two layers are considered for patch projection. Near layer stores the points which are closest to the projection plane, while far layer stores the points farthest away from the projection plane which lie within a predefined encoder parameter, known as the surface thickness, from the near layer. Noting this, two layers each of geometry and texture are formed.

An encoder projects the 3D point cloud onto the multiple 2D frames and generates a bitstream. The encoder or another device then transmits the bitstream to different device. The frames can be compressed by leveraging various video compression codecs, image compression codecs, or both. A decoder receives the bitstream, decompresses the bitstream into the frames, and reconstructs the point cloud based on the information within the frames. After the point cloud is reconstructed, the 3D point cloud can be rendered and displayed for a user to observe. In certain embodiments, frames representing different attributes (including the geometric positions of the points) are encoded and decoded separately. In other embodiments, frames representing different attributes (including the geometric positions of the points) are encoded and decoded together.

Embodiments of the present disclosure provide systems and methods for improving the compression, transmission, and reconstruction of a 3D point cloud. Improving the compression of a 3D point cloud reduces the bandwidth required for the transmission as well as reduces the processing power required to reconstruct the 3D point cloud. For example, the transmission of a bitstream can be improved by reducing the information that is transmitted from the encoder to a decoder. For example, to improve the compression, transmission, and reconstruction of a 3D point cloud embodiments of the present disclosure recognize take into consideration that by reducing the quantity of auxiliary information that is generated for each patch increases the coding efficiency.

FIG. 1 illustrates an example communication system 100 in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-116. The client devices 106-116 may be, for example, a smartphone, a tablet computer, a laptop, a personal computer, a wearable device, a HMD, or the like. The server 104 can represent one or more servers. Each server 104 includes any suitable computing or processing device that can provide computing services for one or more client devices, such as the client devices 106-116. Each server 104 could, for example, include one or more processing devices, one or more memories storing instructions and data, and one or more network interfaces facilitating communication over the network 102. As described in more detail below, the server 104 can transmit a compressed bitstream, representing a point cloud, to one or more display devices, such as a client device 106-116. In certain embodiments, each server 104 can include an encoder.

Each client device 106-116 represents any suitable computing or processing device that interacts with at least one server (such as the server 104) or other computing device(s) over the network 102. The client devices 106-116 include a desktop computer 106, a mobile telephone or mobile device 108 (such as a smartphone), a PDA 110, a laptop computer 112, a tablet computer 114, and a HMD 116. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. The HMD 116 can display a 360° scene including one or more 3D point clouds. In certain embodiments, any of the client devices 106-116 can include an encoder, decoder, or both. For example, the mobile device 108 can record a video and then encode the video enabling the video to be transmitted to one of the client devices 106-116. In another example, the laptop computer 112 can be used to generate a virtual 3D point cloud, which is then encoded and transmitted to one of the client devices 106-116.

In this example, some client devices 108-116 communicate indirectly with the network 102. For example, the mobile device 108 and PDA 110 communicate via one or more base stations 118, such as cellular base stations or eNodeBs (eNBs). Also, the laptop computer 112, the tablet computer 114, and the HMD 116 communicate via one or more wireless access points 120, such as IEEE 802.11 wireless access points. Note that these are for illustration only and that each client device 106-116 could communicate directly with the network 102 or indirectly with the network 102 via any suitable intermediate device(s) or network(s). In certain embodiments, the server 104 or any client device 106-116 can be used to compress a point cloud, generate a bitstream that represents the point cloud, and transmit the bitstream to another client device such as any client device 106-116.

In certain embodiments, any of the client devices 106-114 transmit information securely and efficiently to another device, such as, for example, the server 104. Also, any of the client devices 106-116 can trigger the information transmission between itself and the server 104. Any of the client devices 106-114 can function as a VR display when attached to a headset via brackets, and function similar to HMD 116. For example, the mobile device 108 when attached to a bracket system and worn over the eyes of a user can function similarly as the HMD 116. The mobile device 108 (or any other client device 106-116) can trigger the information transmission between itself and the server 104

In certain embodiments, any of the client devices 106-116 or the server 104 can create a 3D point cloud, compress a 3D point cloud, transmit a 3D point cloud, receive a 3D point cloud, render a 3D point cloud, or a combination thereof. For example, the server 104 can then compress 3D point cloud to generate a bitstream and then transmit the bitstream to one or more of the client devices 106-116. For another example, one of the client devices 106-116 can compress a 3D point cloud to generate a bitstream and then transmit the bitstream to another one of the client device 106-116 or to the server 104.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
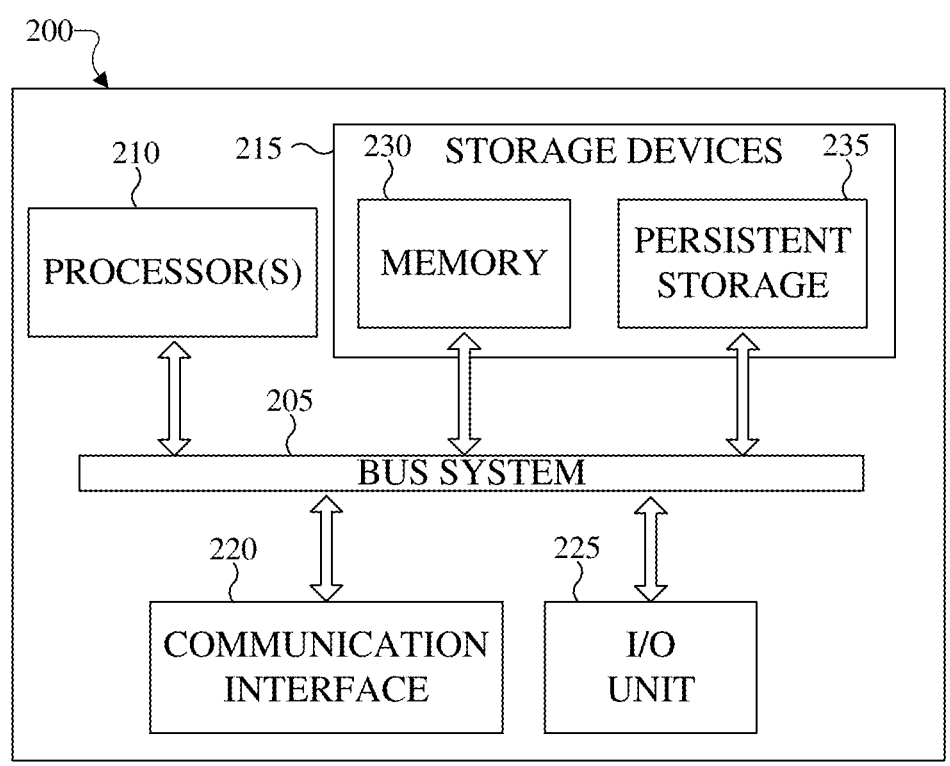
FIGS. 2 and 3 illustrate example electronic devices in accordance with an embodiment of this disclosure.
Figure 3:
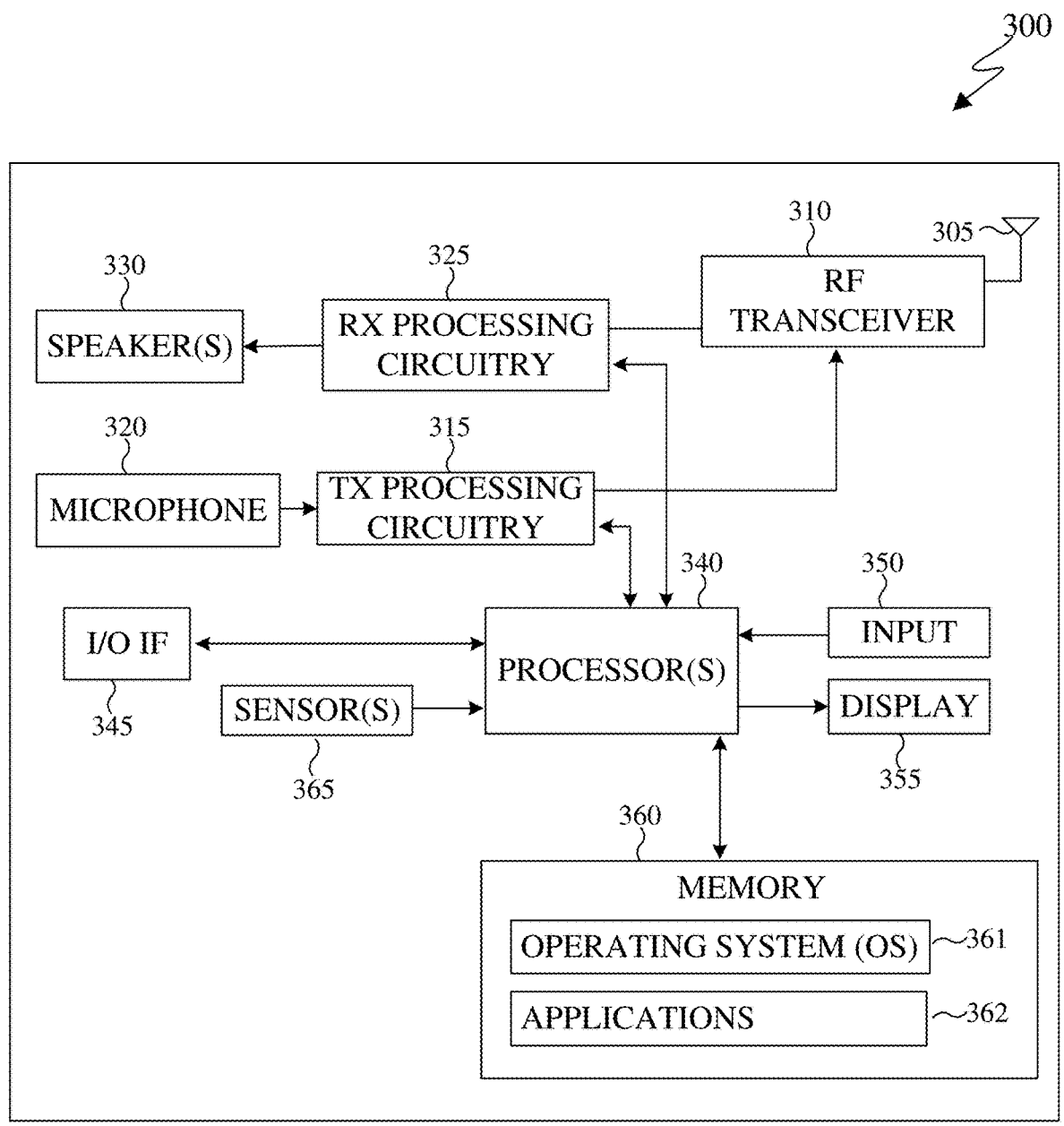

FIGS. 2 and 3 illustrate example electronic devices in accordance with an embodiment of this disclosure. In particular, FIG. 2 illustrates an example server 200, and the server 200 could represent the server 104 in FIG. 1. The server 200 can represent one or more encoders, decoders, local servers, remote servers, clustered computers, and components that act as a single pool of seamless resources, a cloud-based server, and the like. The server 200 can be accessed by one or more of the client devices 106-116 of FIG. 1 or another server.

The server 200 can represent one or more local servers, one or more compression servers, or one or more encoding servers, such as an encoder. In certain embodiments, the encoder can perform decoding. As shown in FIG. 2, the server 200 includes a bus system 205 that supports communication between at least one processing device (such as a processor 210), at least one storage device 215, at least one communications interface 220, and at least one input/output (I/O) unit 225.

The processor 210 executes instructions that can be stored in a memory 230. The processor 210 can include any suitable number(s) and type(s) of processors or other devices in any suitable arrangement. Example types of processors 210 include microprocessors, microcontrollers, digital signal processors, field programmable gate arrays, application specific integrated circuits, and discrete circuitry. In certain embodiments, the processor 210 can encode a 3D point cloud stored within the storage devices 215. In certain embodiments, encoding a 3D point cloud also decodes the 3D point cloud to ensure that when the point cloud is reconstructed, the reconstructed 3D point cloud matches the 3D point cloud prior to the encoding.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a random access memory or any other suitable volatile or non-volatile storage device(s). For example, the instructions stored in the memory 230 can include instructions for decomposing a point cloud into patches, instructions for packing the patches on 2D frames, instructions for compressing the 2D frames, as well as instructions for encoding 2D frames in a certain order in order to generate a bitstream. The instructions stored in the memory 230 can also include instructions for rendering a 360° scene, as viewed through a VR headset, such as HMD 116 of FIG. 1. The persistent storage 235 can contain one or more components or devices supporting longer-term storage of data, such as a read only memory, hard drive, Flash memory, or optical disc.

The communications interface 220 supports communications with other systems or devices. For example, the communications interface 220 could include a network interface card or a wireless transceiver facilitating communications over the network 102 of FIG. 1. The communications interface 220 can support communications through any suitable physical or wireless communication link(s). For example, the communications interface 220 can transmit a bitstream containing a 3D point cloud to another device such as one of the client devices 106-116.

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device. Note, however, that the I/O unit 225 can be omitted, such as when I/O interactions with the server 200 occur via a network connection.

Note that while FIG. 2 is described as representing the server 104 of FIG. 1, the same or similar structure could be used in one or more of the various client devices 106-116. For example, a desktop computer 106 or a laptop computer 112 could have the same or similar structure as that shown in FIG. 2.

FIG. 3 illustrates an example electronic device 300, and the electronic device 300 could represent one or more of the client devices 106-116 in FIG. 1. The electronic device 300 can be a mobile communication device, such as, for example, a mobile station, a subscriber station, a wireless terminal, a desktop computer (similar to the desktop computer 106 of FIG. 1), a portable electronic device (similar to the mobile device 108, the PDA 110, the laptop computer 112, the tablet computer 114, or the HMD 116 of FIG. 1), and the like. In certain embodiments, one or more of the client devices 106-116 of FIG. 1 can include the same or similar configuration as the electronic device 300. In certain embodiments, the electronic device 300 is an encoder, a decoder, or both. For example, the electronic device 300 is usable with data transfer, image or video compression, image or video decompression, encoding, decoding, and media rendering applications.

As shown in FIG. 3, the electronic device 300 includes an antenna 305, a radio-frequency (RF) transceiver 310, transmit (TX) processing circuitry 315, a microphone 320, and receive (RX) processing circuitry 325. The RF transceiver 310 can include, for example, a RF transceiver, a BLUETOOTH transceiver, a WI-FI transceiver, a ZIGBEE transceiver, an infrared transceiver, and various other wireless communication signals. The electronic device 300 also includes a speaker 330, a processor 340, an input/output (I/O) interface (IF) 345, an input 350, a display 355, a memory 360, and a sensor(s) 365. The memory 360 includes an operating system (OS) 361, and one or more applications 362.

The RF transceiver 310 receives, from the antenna 305, an incoming RF signal transmitted from an access point (such as a base station, WI-FI router, or BLUETOOTH device) or other device of the network 102 (such as a WI-FI, BLUETOOTH, cellular, 5G, LTE, LTE-A, WiMAX, or any other type of wireless network). The RF transceiver 310 down-converts the incoming RF signal to generate an intermediate frequency or baseband signal. The intermediate frequency or baseband signal is sent to the RX processing circuitry 325 that generates a processed baseband signal by filtering, decoding, and/or digitizing the baseband or intermediate frequency signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, and/or digitizes the outgoing baseband data to generate a processed baseband or intermediate frequency signal. The RF transceiver 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices. The processor 340 can execute instructions that are stored in the memory 360, such as the OS 361 in order to control the overall operation of the electronic device 300. For example, the processor 340 could control the reception of forward channel signals and the transmission of reverse channel signals by the RF transceiver 310, the RX processing circuitry 325, and the TX processing circuitry 315 in accordance with well-known principles. The processor 340 can include any suitable number(s) and type(s) of processors or other devices in any suitable arrangement. For example, in certain embodiments, the processor 340 includes at least one microprocessor or microcontroller. Example types of processor 340 include microprocessors, microcontrollers, digital signal processors, field programmable gate arrays, application specific integrated circuits, and discrete circuitry.

The processor 340 is also capable of executing other processes and programs resident in the memory 360, such as operations that receive and store data. The processor 340 can move data into or out of the memory 360 as required by an executing process. In certain embodiments, the processor 340 is configured to execute the one or more applications 362 based on the OS 361 or in response to signals received from external source(s) or an operator. Example, applications 362 can include an encoder, a decoder, a VR or AR application, a camera application (for still images and videos), a video phone call application, an email client, a social media client, a SMS messaging client, a virtual assistant, and the like. In certain embodiments, the processor 340 is configured to receive and transmit media content.

The processor 340 is also coupled to the I/O interface 345 that provides the electronic device 300 with the ability to connect to other devices, such as client devices 106-114. The I/O interface 345 is the communication path between these accessories and the processor 340.

The processor 340 is also coupled to the input 350 and the display 355. The operator of the electronic device 300 can use the input 350 to enter data or inputs into the electronic device 300. The input 350 can be a keyboard, touchscreen, mouse, track ball, voice input, or other device capable of acting as a user interface to allow a user in interact with the electronic device 300. For example, the input 350 can include voice recognition processing, thereby allowing a user to input a voice command. In another example, the input 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 350 can be associated with the sensor(s) 365 and/or a camera by providing additional input to the processor 340. In certain embodiments, the sensor 365 includes one or more inertial measurement units (IMUs) (such as accelerometers, gyroscope, and magnetometer), motion sensors, optical sensors, cameras, pressure sensors, heart rate sensors, altimeter, and the like. The input 350 can also include a control circuit. In the capacitive scheme, the input 350 can recognize touch or proximity.

The display 355 can be a liquid crystal display (LCD), light-emitting diode (LED) display, organic LED (OLED), active matrix OLED (AMOLED), or other display capable of rendering text and/or graphics, such as from websites, videos, games, images, and the like. The display 355 can be sized to fit within a HMD. The display 355 can be a singular display screen or multiple display screens capable of creating a stereoscopic display. In certain embodiments, the display 355 is a heads-up display (HUD). The display 355 can display 3D objects, such as a 3D point cloud.

The memory 360 is coupled to the processor 340. Part of the memory 360 could include a RAM, and another part of the memory 360 could include a Flash memory or other ROM. The memory 360 can include persistent storage (not shown) that represents any structure(s) capable of storing and facilitating retrieval of information (such as data, program code, and/or other suitable information). The memory 360 can contain one or more components or devices supporting longer-term storage of data, such as a read only memory, hard drive, Flash memory, or optical disc. The memory 360 also can contain media content. The media content can include various types of media such as images, videos, three-dimensional content, VR content, AR content, 3D point clouds, and the like.

The electronic device 300 further includes one or more sensors 365 that can meter a physical quantity or detect an activation state of the electronic device 300 and convert metered or detected information into an electrical signal. For example, the sensor 365 can include one or more buttons for touch input, a camera, a gesture sensor, an IMU sensors (such as a gyroscope or gyro sensor and an accelerometer), an eye tracking sensor, an air pressure sensor, a magnetic sensor or magnetometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 365 can further include control circuits for controlling any of the sensors included therein.

As discussed in greater detail below, one or more of these sensor(s) 365 may be used to control a user interface (UI), detect UI inputs, determine the orientation and facing the direction of the user for three-dimensional content display identification, and the like. Any of these sensor(s) 365 may be located within the electronic device 300, within a secondary device operably connected to the electronic device 300, within a headset configured to hold the electronic device 300, or in a singular device where the electronic device 300 includes a headset.

The electronic device 300 can create media content such as generate a virtual object or capture (or record) content through a camera. To transmit the media content to another device, the electronic device 300 can compress and encode the content. When preparing the media content to be transmitted, the electronic device 300 can project the point cloud into multiple patches. For example, a cluster of points of the point cloud can be grouped together and depicted as a patch in a 2D frame. A patch can represent a single attribute of the point cloud, such as geometry, color, and the like. Patches that represent the same attribute can be packed into individual 2D frames, respectively. FIGS. 4A-4C, which are described in greater detail below, illustrate a 3D point cloud that is represented by patches on different frames.

The 2D frames are then encoded to generate a bitstream. The frames can be encoded individually or together. During the encoding process additional content such as metadata, flags, occupancy maps, auxiliary information, and the like can be included in the bitstream. The electronic device 300 can encode the media content to generate a bitstream, such that the bitstream can be transmitted directly to another electronic device or indirectly such as through the network 102 of FIG. 1. Another electronic device, similar to the electronic device 300, can receive a bitstream directly from the electronic device 300 or indirectly such as through the network 102 of FIG. 1.

Similarly, when decoding media content included in a bitstream that represents a 3D point cloud, the electronic device 300 decodes the received bitstream into frames. In certain embodiments, the decoded bitstream also includes an occupancy map. The decoded bitstream can also include one or more flags, or quantization parameter size, auxiliary information, or any combination thereof. A geometry frame can include pixels that indicate geographic coordinates of points of the point cloud in 3D space. Similarly, a color frame can include pixels that indicate the RGB color of each geometric point in 3D space. In certain embodiments, an individual frame can include points from different layers. In certain embodiments, after reconstructing the 3D point cloud, the electronic device 300 can render the 3D point cloud in three dimensions via the display 355.

Although FIGS. 2 and 3 illustrate examples of electronic devices, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication, electronic devices and servers can come in a wide variety of configurations, and FIGS. 2 and 3 do not limit this disclosure to any particular electronic device or server.

FIGS. 4A, 4B, and 4C illustrate an example 3D point cloud and 2D frames that represent the 3D point cloud in accordance with an embodiment of this disclosure. In particular, FIG. 4A illustrates a 3D point cloud 400, and FIGS. 4B and 4C each illustrate a 2D frame that includes patches. The FIG. 4B illustrates a 2D frame 410 that represents the geometric position of points of the 3D point cloud 400. The FIG. 4C illustrates the texture frame 420 that represents the color (or another attribute) associated with points of the 3D point cloud 400. The embodiment of FIGS. 4A, 4B, and 4C, are for illustration only and other embodiments could be used without departing from the scope of this disclosure.

The 3D point cloud 400 is a set of data points in 3D space. Each point of the 3D point cloud 400 includes multiple attributes such as (i) geometric position that provides the structure of the 3D point cloud and (ii) one or more textures that provide information about each point such as color, reflectiveness, material, and the like.

FIGS. 4B and 4C illustrate the 2D frames 410 and 420 respectively. The frame 410, depicts multiple patches (such as a patch 412) representing the depth values of the 3D point cloud 400. The frame 420, depicts multiple patches (such as a patch 422) representing the color of the 3D point cloud 400. Each pixel of color in the frame 420 corresponds to a particular geometry pixel in the frame 410. For example, a mapping is generated between each pixel in the frame 410 and the frame 420. The location of the patches within the 2D frames 410 and 420 can be similar for a single position of the 3D point cloud. For example, as the 3D point cloud 400 changes, new frames can be generated with different patches based on the new position the 3D point cloud.

Although FIGS. 4A, 4B, and 4C illustrate example point cloud and 2D frames representing a point cloud various changes can be made to FIGS. 4A, 4B, and 4C. For example, the point cloud and point mesh represent a single object, whereas in other embodiments, a point cloud or point mesh can represent multiple objects, scenery (such as a landscape), a virtual object in AR, and the like. In another example, the patches included in the 2D frames can represent other textures, such as luminance, material, and the like. FIGS. 4A, 4B, and 4C do not limit this disclosure to any particular 3D object(s) and 2D frames representing the 3D object(s).

Figure 5A:
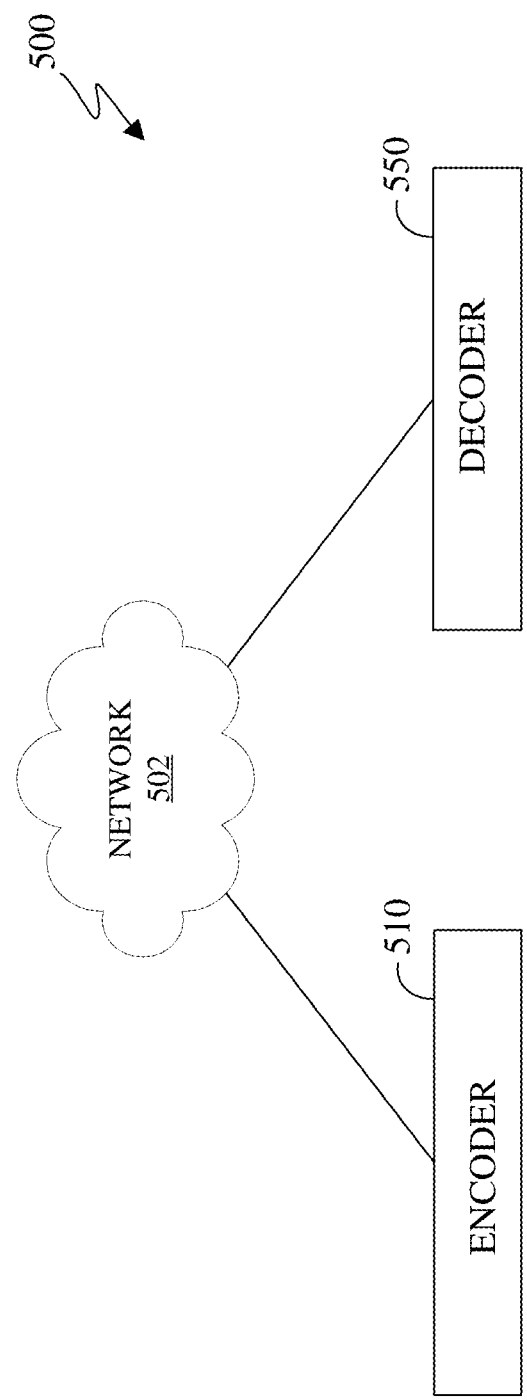
FIG. 5A illustrates a block diagram of an example environment-architecture in accordance with an embodiment of this disclosure.
Figure 5B:
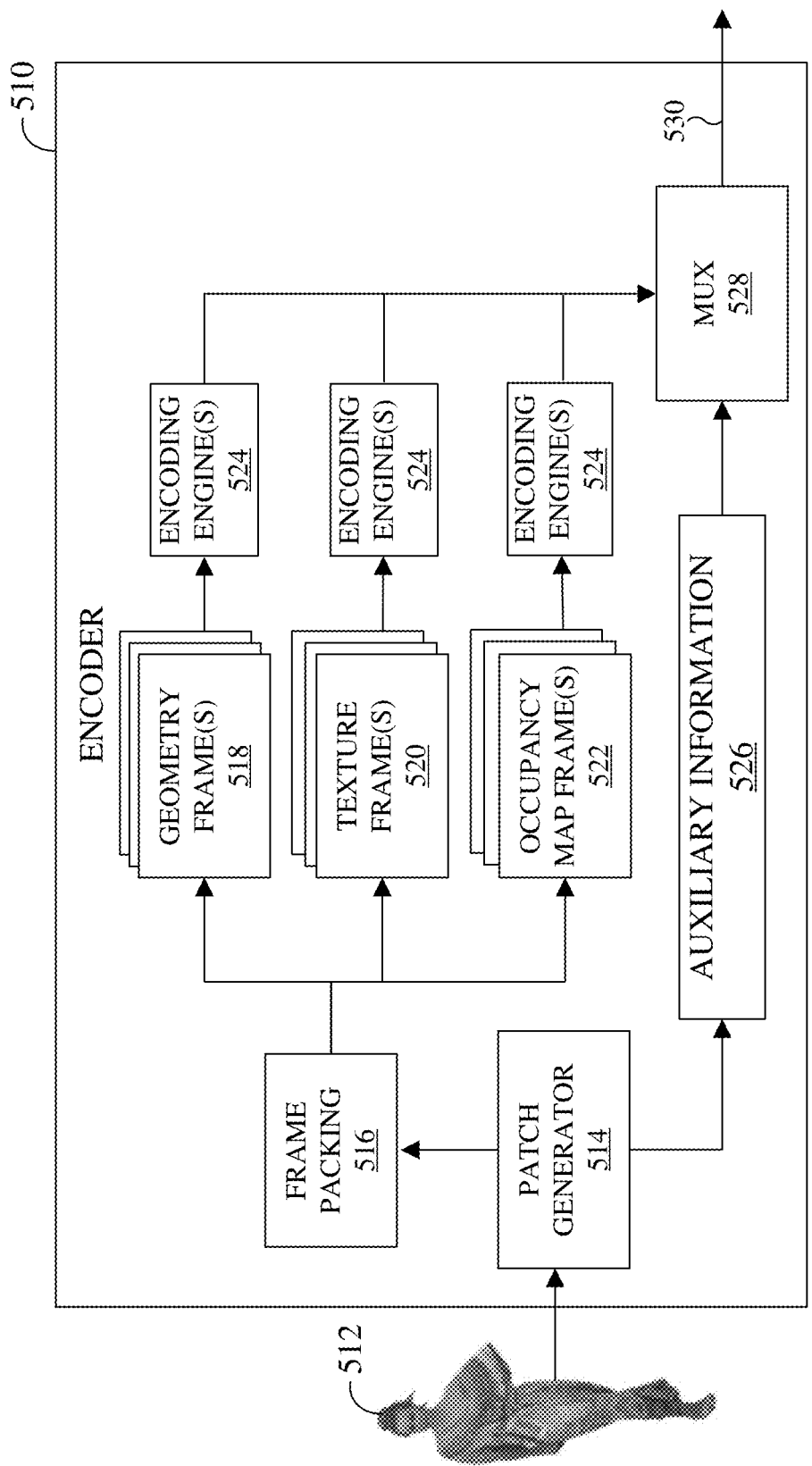
FIG. 5B illustrates an example block diagram of an encoder in accordance with an embodiment of this disclosure.
Figure 5C:
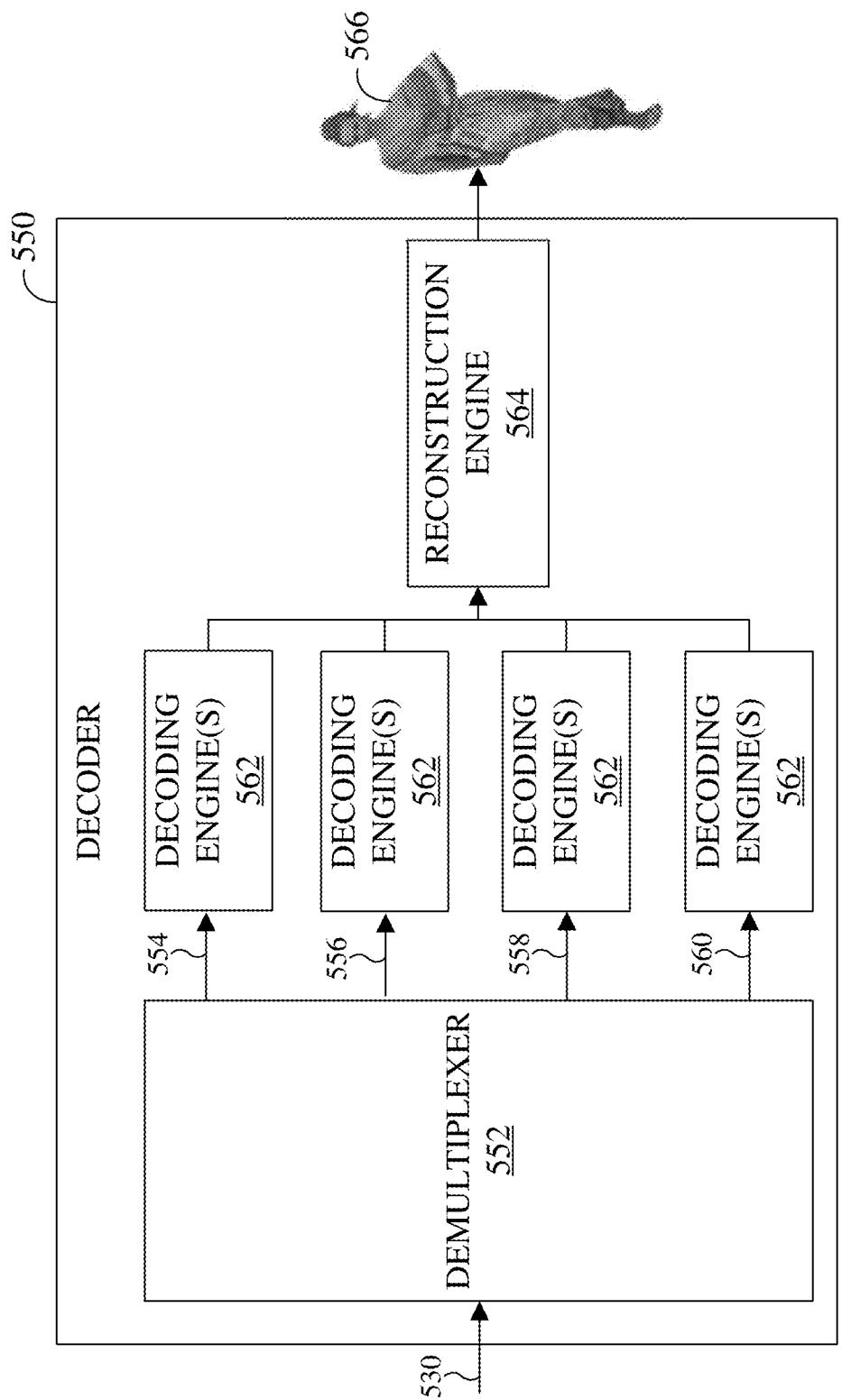
FIG. 5C illustrates an example block diagram of a decoder in accordance with an embodiment of this disclosure.

FIGS. 5A, 5B, and 5C illustrate block diagrams in accordance with an embodiment of this disclosure. In particular, FIG. 5A illustrates a block diagram of an example environment-architecture 500 in accordance with an embodiment of this disclosure. FIG. 5B illustrates an example block diagram of the encoder 510 of FIG. 5A in accordance with an embodiment of this disclosure. FIG. 5C illustrates an example block diagram of the decoder 550 of FIG. 5A in accordance with an embodiment of this disclosure. The embodiments of FIGS. 5A, 5B, and 5C are for illustration only. Other embodiments can be used without departing from the scope of this disclosure.

As shown in FIG. 5A, the example environment-architecture 500 includes an encoder 510 and a decoder 550 in communication over a network 502. The network 502 can be the same as or similar to the network 102 of FIG. 1. In certain embodiments, the network 502 represents a "cloud" of computers interconnected by one or more networks, where the network is a computing system utilizing clustered computers and components that act as a single pool of seamless resources when accessed. Also, in certain embodiments, the network 502 is connected with one or more servers (such as the server 104 of FIG. 1, the server 200), one or more electronic devices (such as the client devices 106-116 of FIG. 1, the electronic device 300), the encoder 510, and the decoder 550. Further, in certain embodiments, the network 502 can be connected to an information repository (not shown) that contains a VR and AR media content that can be encoded by the encoder 510, decoded by the decoder 550, or rendered and displayed on an electronic device.

In certain embodiments, the encoder 510 and the decoder 550 can represent the server 104, one of the client devices 106-116 of FIG. 1, or another suitable device. The encoder 510 and the decoder 550 can include internal components similar to the server 200 of FIG. 2 and electronic device 300 of FIG. 3. In certain embodiments, the encoder 510 and the decoder 550 can be a "cloud" of computers interconnected by one or more networks, where each is a computing system utilizing clustered computers and components to act as a single pool of seamless resources when accessed through the network 502. In some embodiments, a portion of the components included in the encoder 510 or the decoder 550 can be included in different devices, such as multiple servers 104 or 200, multiple client devices 106-116, or other combination of different devices. In certain embodiments, the encoder 510 is operably connected to an electronic device or a server while the decoder 550 is operably connected to an electronic device. In certain embodiments, the encoder 510 and the decoder 550 are the same device or operably connected to the same device.

The encoder 510 receive 3D media content, such as a point cloud, from another device such as a server (similar to the server 104 of FIG. 1, the server 200 of FIG. 2) or an information repository (such as a database). In certain embodiments, the encoder 510 can receive media content from multiple cameras and stitch the content together to generate a 3D scene that includes one or more point clouds. After receiving the content, the encoder 510 projects a content into two dimensions which create patches that represent the projection. The encoder 510 clusters points of a point cloud into groups which are projected onto different planes such as an XY plane, an YZ plane, and an XZ plane. Each cluster of points is represented by a patch when projected onto a plane. It is noted, that a point of the 3D point cloud is located in 3D space based on a (X,Y,Z) coordinate value. When the point is projected onto a 2D frame, a pixel representing the projected point, is denoted by the column and row index in the frame indicated by the coordinate (u,v). Additionally, 'u' and 'v' can range from zero to the number of rows or columns in the depth image, respectively. The encoder 510 transmits frames representing the point cloud as an encoded bitstream. The bitstream can be transmitted to an information repository (such as a database) or an electronic device that includes a decoder (such as the decoder 550), or the decoder 550 itself through the network 502. The encoder 510 is described below in FIG. 5B.

The decoder 550 can receive a bitstream that represents media content, such as a point cloud. The bitstreams can include data representing a 3D point cloud. In certain embodiments, the decoder 550 can decode the bitstream that includes the multiple frames and auxiliary information that are used when reconstructing the point cloud. The auxiliary information associated with one frame can indicate that the decoder is to reference auxiliary information from another frame when reconstructing the point cloud. The decoder 550 is described with more below in FIG. 5C.

FIG. 5B illustrates the encoder 510 that generates a bitstream 530 that represent a point cloud 512. The bitstream 530 which can include multiple bitstreams and can be transmitted via the network 502 of FIG. 5A to another device, such as the decoder 550. The encoder 510 includes a patch generator 514, a frame packing 516, various frames (such as one or more geometry frames 518, one or more texture frames 520, and one or more occupancy map frames 522), one or more encoding engines 524, auxiliary information 526, and a multiplexer 534.

The point cloud 512 can be stored in memory (not shown) or received from another electronic device (not shown). The point cloud 512 can be a single 3D object, or a grouping of 3D objects. The point cloud 512 can be stationary object or an object which moves.

The patch generator 514 generates patches by taking projections of the point cloud 512. In certain embodiments, the patch generator 514 splits the geometry attribute and each texture attribute of each point of the point cloud 512. The patch generator 514 can use two or more projection planes, to cluster the points of the point cloud 512 to generate the patches. For each input point cloud, such as the point cloud 512, the geometry attribute and one or more texture attributes (such as color) are clustered using one or more criteria. The criteria include a normal direction, a distance to projected frames, contiguity, and the like. After the points are clustered, the geometry attribute and a corresponding texture attribute for each point are projected onto planes, such as the XY plane, the YZ plane, or the XZ plane.

When projected, each cluster of points of the point cloud 512 appears as patch. Each a patch (also referred to as a regular patch) represents a particular attribute of the point cloud. For example, a single cluster of points can be represented as a single patch on different frames, where each patch represents a different attribute of the single cluster of points. It is noted that patches representing different attributes of the same cluster of points include a correspondence or a mapping, such that a pixel in one patch corresponds to the same pixel in another patch. In certain embodiments, the pixels representing geometry are packed into one frame, such as the geometry frames 518, and the pixels representing texture are packed into another frame, such as the texture frames 520.

The frame packing 516 sorts and packs the patches (both the geometry and texture patches) into respective frames, such as the geometry frames 518 and the texture frames 520. As illustrated in FIGS. 4B and 4C, the frame packing 516 organizes the by attributes and places the patches within corresponding frames, such as the patch 412 is included in the geometry frame 410 and the patch 422 is included in the texture frame 420. The frame packing 516 also generates one or more occupancy map frames 522 based on the placement of the patches within the geometry frames 518 and the texture frames 520.

The geometry frames 518 (as illustrated by the geometry frames 410 of FIG. 4B) include pixels which represent the geographic location of each point of the point cloud 512. The location of the pixels in the geometry frame 518 represents the geometry values of the point cloud 512. The pixels representing the geometry values of the point cloud 512 are grouped into patches that represent a cluster of points of the point cloud 512.

The texture frames 520 (as illustrated by the texture frame 420 of FIG. 4C) represent a single attribute of the point cloud 512, such as color. The texture frames 520 include pixels representing values of a particular texture of the point cloud 512. The pixels representing the texture values of the point cloud 512 are grouped into patches that represent a cluster of points of the point cloud 512.

The occupancy map frames 522 represent occupancy maps that indicate the valid pixel location in the frames (such as the geometry frames 518 and the texture frames 520) and the invalid pixel locations in the frames. The valid pixels correspond to actual points of the 3D point cloud 512 which are projected into patches (via the patch generator 514) and packed into respective frames (via the frame packing 516). A valid pixel at location (u,v) on the occupancy map indicates a pixel on at location (u,v) of the geometry frame 518 and a pixel on at location (u,v) of texture frame 520 represent a point of the point cloud. An invalid pixel at location (u,v) on the occupancy map indicates a pixel on at location (u,v) of the geometry frame 518 and a pixel on at location (u,v) of texture frame 520 do not represent a point of the point cloud. In certain embodiments, one of the occupancy map frames 522 can correspond to the both a geometry frame 518 and a texture frames 520. In other embodiments, the one of the occupancy map frames 522 correspond to one of the geometry frame 518 and another one of the occupancy map frames 522 corresponds to one of the texture frames 520.

The encoding engines 524 encode the geometry frames 518, the texture frames 520, and the occupancy map frames 522. In certain embodiments, the frames (such as the geometry frames 518, the texture frames 520, and the occupancy map frames 522) are encoded by independent encoders. For example, one encoding engine 524 can encode the geometry frames 518, another encoding engine 524 can encode the texture frames 520, and yet another encoding engine 524 can encode the occupancy map frames 522. In certain embodiments, the encoding engines 524 can be configured to support an 8-bit, a 10-bit, a 12-bit, a 14-bit, or a 16-bit, precision of data. The encoding engine 524 can be a video or image codec such as HEVC, AVC, VP9, VP8, JVNET, and the like to compress the 2D frames representing the 3D point cloud.

The auxiliary information 526 includes information describing the patches. For each patch, the auxiliary information 526 can include the height, width, position on the 2D frame, position in 3D space projection direction, and the like. Such information can be expressed as patch_u0, patch_v0, patch_u1, patch_v1, patch_d1, respectively. For example, the auxiliary information 526 includes an X-offset and a Y-offset. In certain embodiments, the auxiliary information 526 is compressed before being multiplexed into the bitstream 530.

Sending the auxiliary information 526 for each patch generally consumes lots of information. For example, the height, the width, the position on the 2D frame, the position in 3D space projection direction, is associated with each patch of each frame. Therefore, embodiments of the present disclosure provide systems and methods for reducing the quantity of data included in the auxiliary information 526. In certain embodiments, the auxiliary information is modified such that instead of transmitting the patch information (such as size and position) of every patch, the encoder 510 identifies whether any patches within a current frame match patches in a previous frame. For example, the encoder 510 generates a correspondence between patches of the current frame that match patches of a previous frame. The previous frame is referred to as a reference frame or a reference patch frame and is previously generated by the patch generator 514 and the frame packing 516. In certain embodiments, a current frame is the frame that is currently being generated by the patch generator 514 and the frame packing 516. An index is assigned to each patch in the current frame that matches a patch in the reference frame. For example, the index assigned to a patch in the current frame can be referred to as "patch X of the current frame," "current index X," or "current patch index" where X identifies the index number. Similarly, an index is assigned to each patch in the reference frame that matches a patch in the current frame. For example, an index assigned to a patch in the reference frame can be referred to as a "patch Y of the reference frame," "reference index Y," or "reference patch index" where Y identifies the index number. As each patch from the current frame is processed, its index is referred to as the current patch index.

Figures 6A, 6B:
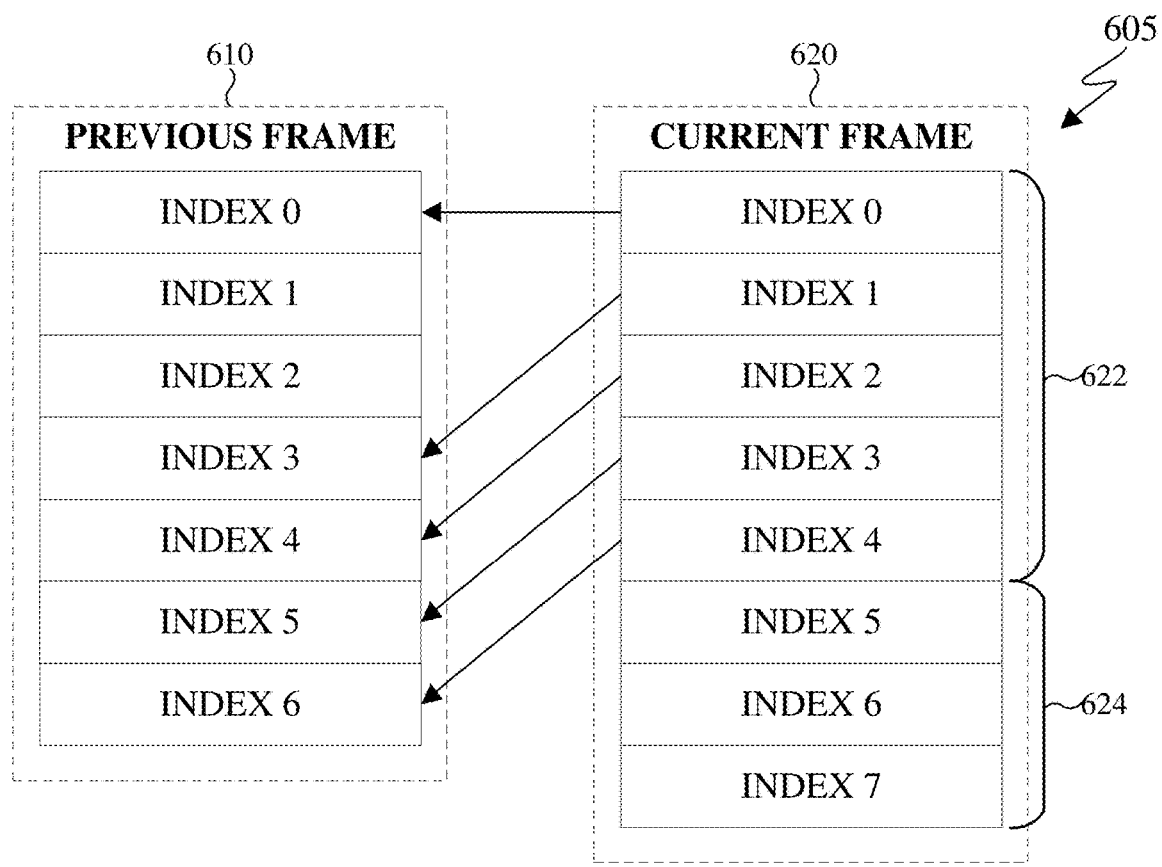
FIG. 6A illustrates an example patch matching process between a current frame and a reference frame in accordance with an embodiment of this disclosure.
FIG. 6B illustrates an example table, based on the patch matching process of FIG. 6A, in accordance with an embodiment of this disclosure.

When a patch in the current frame matches a patch in a previous frame, the auxiliary information 526 associated with the patch in the current frame can simply reference the auxiliary information 526 of a patch in the previous frame, to predict the auxiliary information efficiently. Then only the difference between the predicted information and the actual auxiliary information needs to be coded in the bitstream. By using the auxiliary information 526 associated with a patch from a previous frame for prediction, the total information that is transmitted in the bitstream is reduced. Moreover, instead of transmitting the index of the patch from the previous frame that matches a patch in the current frame, the encoder 510 generates a predictor index. The previous frame need not be the previous frame temporally or in the decoding order. That is, any previously coded frame can be the previous frame. To further increase the coding efficiency (or minimize the bit-rate) the difference between the index of the matched patch from the previous frame and the predictor index should be as small as possible. The index of the matched patch from the previous frame is also referred to as the reference patch index. The difference between the reference patch index and the predictor index is then coded. In certain embodiments, the difference between the reference patch index and the predictor index is coded using an exponential Golomb code. FIGS. 6A and 6B describe the patch matching processing and the prediction of the reference patch that is associated with a previous frame.

In certain embodiments, when delta coding is enabled and the frame is not the first frame in the coding order, the encoder 510 identifies whether any patches within a current frame match patches in a previous frame. The first frame in the coding order refers to the first frame that is generated. It is noted that the first frame is in the coding order cannot match any previous frame, as it is the first frame.

If at least one patch included in the current frame matches a patch in a previous frame, the encoder 510 separates the patches in the current frame into two groups. Patches of the current frame that match patches of the previous frame are identified as matched patches, and patches of the current frame that do not match patches of the previous frame are identified as unmatched patches. Once patches of the current frame match patches of the reference frame, the patches of the current frame are reordered. For example, FIG. 6A illustrates the current frame 620 includes grouping 622 which includes all of the matched patches and grouping 624 which includes all of the patches that that do not match any patches of the previous frame.

For example, for every patch in the previous frame, the closest matching patch from the current frame is identified. The closest matching patch is identified based on a distance threshold. For each matched patch identified, the patch is placed at the next position in the matched patches list (or grouping), while the unmatched patches from the current frame are placed in the unmatched group (or grouping).

In certain embodiments, the encoder 510 includes an indication in the bitstream to notify the decoder 550 as to the patch type such as an inter patch, an intra patch, a RAW patch, and the like. In certain embodiments, the patch type of each patch is coded and transmitted to the decoder 550. When a particular patch is identified as an intra patch (or I-patch), indicates that the particular patch does not match a patch in the previous frame. When a particular patch is identified as an inter patch (or P_INTER), the encoder 510 notifies the decoder 550 as to which patch from the previous frame is used to predict the current patch via a delta index associated with the current index. For example, when the particular patch is identified as an inter patch, the auxiliary information (such as height, width, position on the 2D frame, position in 3D space projection direction, and the like) can be predicted from a corresponding matched patch from a reference frame.

For patches in the unmatched group, no prediction from a matched patch in the previous frame is used to code size and position information. However, an unmatched patch can use prediction from a previous patch in the current frame. For the unmatched patches, syntax elements patch_u0, patch_v0, patch_u1, patch_v1, and patch_d1 are coded using fixed number of bits. The number of bits needed to signal each of the above syntax elements can be conditionally signaled (using bit_count_*syntax elements where * may be u0, v0, u1, v1, or d1). Alternatively, the number of bits needed to signal each of the above syntax elements can be implicitly derived from the maximum values of the corresponding elements from the matched group. Generally, five flags are used to specify the number of bits signaled for each of the above syntax elements.

For each patch of the current frame that is within the matched patches group, the index of the corresponding matching patch from the previous frame is predicted. That is, instead of the encoder 510 transmitting the index directly to the decoder 550, a predictor index for each matched patch in the current frame is generated and the difference between the index of the matched patch from the previous frame (reference patch index or reference index) and the predictor index of the matched patch from the current frame is signaled to the decoder. For each patch in the matches patch group from the current frame, the decoder 550 derives the predictor index and adds the difference between the reference patch index and the predictor index coded in the bitstream to derive the reference patch index. Then for the matched patch from the current frame, instead of signaling patch_u0, patch_v0, patch_u1, patch_v1, patch_d1 directly, they are signaled differentially based on corresponding elements from the matching patch (with reference patch index) from the previous frame.

The index of the corresponding reference patch (denoted as RefPatchIdx or reference patch index) is predicted and the difference between RefPatchIdx and the predictor (denoted as PredictorIdx or predictor index) is signaled in the bitstream in the form of a syntax element dpdu_patch_index (also referred to as a delta patch index).

For example, for patches in the current frame the encoder 510 identifies a previous frame that includes at least one patch that matches a patch in the current frame. The encoder 510 can identify an index of the patches included in the previous frame. The encoder 510 reorders the patches in the current frame index such that the matched matches are grouped together and the unmatched patches are grouped together. The encoder 510 generates a predictor index. The predictor index predicts the index of the patch from the previous frame that matches each patch for the "matches patches" group in the current frame. Equation (1) describes the generating the predictor index relating a patch, p, of a current frame to the corresponding patch in a reference frame.

$$\text{predictorIdx}_{(for\ patch\ p)} = \text{RefPatchIdx}_{(for\ patch(p-1))} + 1 \quad (1)$$

Patch p of Equation (1) corresponds to an index of a patch from the "matched patches" group of the current frame. Equation (1) is applied to a patch in the "matched patches" group of the current frame where the patch is not the first (index 0) patch in the current frame. For a patch in the current patch index that is the zeroth patch, the predictor index for that patch is set to zero.

Equation (1) relates a particular patch index within a current frame to a patch index in the reference frame. For example, if patch zero of the current frame matches patch zero of the reference frame, and patch one of the current frame matches patch three of the reference frame, the predictor for patch one of the current frame is based on patch zero of the reference frame (which actually matches patch zero of the current frame).

The encoder 510 also generates a delta index (the dpdu_delta_index or DPDU_Index) that represents a differential value between the reference patch index and the predictor index. The encoder 510 includes the delta index for the current patch in the auxiliary information 526, which is associated with the current frame. Equation (2) below describes generating the delta index.

$$\text{DPDU\_Index}_{(for\ patch\ p)} = \text{RefPatchIdx}_{(for\ patch\ p)} - \text{PredictorIdx}_{(for\ patch\ p)} \quad (2)$$

The multiplexer 534 combines the multiple frames (such as the geometry frames 518, the texture frames 520, and the occupancy map frames 522) which are encoded, to create a bitstream 530.

FIG. 5C illustrates the decoder 550 that includes a demultiplexer 552, one or more decoding engines 562, and a reconstruction engine 564. The decoder 550 receives a bitstream 530, such as the bitstream that was generated by the encoder 510. The demultiplexer 552 separates bitstream 530 into one or more bitstreams representing the different frames. For example, the demultiplexer 552 separates various streams of data such as the geometry frame information 554 (originally the geometry frames 518 of FIG. 5B), texture frame information 556 (originally the texture frames 520 of FIG. 5B), the occupancy map information 558 (originally the occupancy map frames 522 of FIG. 5B), and the auxiliary information 560 (originally the auxiliary information 526 of FIG. 5B).

The decoding engines 562 decode the geometry frame information 554 to generate the geometry frames 518. The decoding engines 562 decode the texture frame information 556 to generate the texture frames 520. Similarly, the decoding engines 562 decode the occupancy map information 558 to generate the occupancy map frames 522. The decoding engines 562 also decode the auxiliary information 560 to generate the auxiliary information 526. In certain embodiments, a single decoding engine 562 decodes the geometry frame information 554, the texture frame information 556, and the occupancy map information 558.

In certain embodiments, when the auxiliary information 560 is decoded (or decompressed) by the decoding engine 562, the patch information for each patch included in a current frame is identified. The decoding engine 562 can identify whether a patch included in a current frame of the geometry frames 518 or a frame included in the texture frames 520 is an intra patch or an inter patch. For a patch identified as an intra patch, the decoding engine 562 determines that the patch information is included explicitly in the auxiliary information of the current frame or predicted from a previous patch of the current frame.

For a patch identified as an inter patch (or P_INTER), the decoding engine 562 determines that the patch information is predicted from the auxiliary information of another frame. For example, the decoding engine 562 can identify that a particular patch is an inter patch. In that case, the auxiliary information 560 for that patch includes a delta index coded in the bitstream. The decoding engine 562 parses the delta index. The decoding engine 562 derives the predictor index independent of the delta index. After deriving the predictor index, the decoding engine 562 derives the reference index based on the predictor index and the delta index.

The decoder 550 receives the delta patch index 638. The decoder 550 then derives the reference patch index that is associated with the current patch index. Before deriving the reference index that matches the current patch index, the decoder 550 identifies the predictor index based on Equation (1). The decoder 550 then derives the reference patch index for the current patch based on Equation (3), below.

$$\text{RefPatch}_{(for\ patch\ p)} = \text{PredictorIdx}_{(for\ patch\ p)} + \text{DPDU\_Index}_{(for\ patch\ p)} \quad (3)$$

The predictor index of a current patch with index zero is set to zero. The predictor index of a patch in the current frame with an index greater than zero is set to the reference patch index of the previous patch plus one. For each inter patch, the decoder 550 parses the DPDU_Index (or delta index) from the bitstream and adds it to the predictor index to generate reference patch index. Once the reference patch index is generated, the decoder 550 can generate auxiliary information for the current patch with index p using the auxiliary information for the reference patch and then reconstruct the point cloud.

For example, if patch zero in the current frame corresponds to a patch zero in the reference frame, and patch one in the current frame corresponds to patch three in the reference frame, then the predictor index for patch zero in the current frame is set to zero. The decoder 550 reads a DPDU_Index (or delta index) of zero from the bitstream. Then the reference patch index for patch zero in the current frame is set to zero since, zero (the predictor index) plus zero (the value for DPDU_index) is zero. Next, the decoder 550 sets the predictor index for patch one in the current frame to be equal to reference patch index corresponding to the previous patch in the current frame plus one. The previous patch in the current frame is patch zero. The reference patch index for patch zero, of the current frame, is zero. Hence the predictor index for patch one in the current frame is set to zero plus one, which is equal to one. The decoder 550 then identifies the patch in the reference frame patch that corresponds to patch one in the current frame as follows. The decoder reads a DPDU_Index (or delta index) of two from the bitstream. Using Equation (3), the reference patch index for patch one in the current frame is equal to the predictor index for patch one in the current frame (one) plus the DPDU_Index (two). One plus two yield three, which is reference patch index for patch one in the current frame.

After the geometry frame information 554, the texture frame information 556, the occupancy map information 558 are decoded and the auxiliary information 560 for the patch in the current frame is predicted, the reconstruction engine 564 generates a reconstructed point cloud 566. The first frame and the second frame can be included in the geometry frame information 554, the texture frame information, or both. The reconstructed point cloud 566 is similar to the point cloud 512.

Although FIGS. 5A-5C illustrates one example of a transmitting a point cloud various changes may be made to FIG. 5A-5C. For example, additional components can be included in the encoder 510 and the decoder 550.

FIG. 6A illustrates an example patch matching process 605 between a current frame 620 and a previous frame 610 in accordance with an embodiment of this disclosure. FIG. 6B illustrates an example table 630, based on the patch matching processor 605 of FIG. 6A, in accordance with an embodiment of this disclosure. The embodiment of FIGS. 6A and 6B are for illustration only and other embodiments could be used without departing from the scope of this disclosure.

The previous frame 610 represents a frame in coding order that was coded prior to coding the current frame 620. For example, the previous frame 610 can be adjacent to the current frame 620. For another example the previous frame 610 can be a prior frame that is not the adjacent to the current frame 620. The previous frame 610 can represent an earlier time than the current frame 620. For example, the previous frame 610 and the current frame 620 represent the point cloud at different instances in time.

In certain embodiments, the encoder 510 determines whether the current frame is the first frame in the coding order. As illustrated in FIG. 6A, the current frame 620 is not the first frame in the coding order since previous frame 610 is sequentially before the current frame 620.

After determining that the current frame is not the first frame in the coding order, the encoder 510 identifies the matches between the patches of the current frame 620 and the patches of the previous frame 610. For example, the encoder 510, matches patches within the current frame 620 to patches within the previous frame. For example, the patch zero of the current frame 620 matches patch zero of the previous frame 610 (stated differently current index zero matches reference index zero). Similarly, patch one of the current frame 620 matches the patch three of the previous frame 610 (stated differently current index 1 matches reference index three). It is noted that index five, six or seven of the current frame 620 do not match any of the patches within the previous frame 610.

In certain embodiments, the encoder 510 can reorder the patches within the current frame such that all of the matched patches are grouped together, such as grouping 622 and all of the unmatched patches are grouped together such as the unmatched grouping 624.

The table 630 includes different columns relating the various current patches indexes 632 of the current frame 620 to various reference patches indexes 634 of the previous frame 610. The current patch indexes 632 include only the matched patches of the current frame 620. Each current index of the current patch indexes 632 matches the adjacent patch listed in the reference patch index 634, as illustrated in the patch matching process 605. For example, the first row of the table 630 depicts current index zero of the current frame 620 matching reference index zero of the previous frame 610. Similarly, the second row of the table 630 depicts current index one of the current frame 620 matching reference index three of the previous frame 610.

For current index zero of the current patches index 632, the predictor index is set to zero. For any patch of the current patches index 632 that is greater than zero, the encoder 510 derives the predictor index 636 based on Equation (1), described above. For example, to derive the predictor index for the current index one, the encoder 510 identifies the index in the reference patches index 634 that is associated with the index that is one less than the current index one. Patch zero of the current frame is the previous index to the current index one. As such, the predictor for current index one is the reference index associated with the current index zero (which corresponds to the reference index zero) plus one (the integer from Equation (1)). The predictor for current index one is one since zero (reference index zero) plus one equals one.

To derive the predictor for the current index two, the encoder 510 identifies the index in the reference patches index 634 that is associated with the index that is one less than the current index two. It is noted that patch one of the current frame is the previous index to the current index two. The reference patch for the patch one of the current frame is reference index three. As such, the predictor for current index two is the reference index associated with the current index one (which corresponds to the reference index three) plus one (the integer from Equation (1)). Therefore, the predictor for current index two is four, since three (reference index three) plus one equals four.

Similarly, to derive the predictor for the current index three, the encoder 510 identifies the index in the reference patches index 634 that is associated with the index that is one less than the current index three. It is noted that patch two of the current frame is the previous index to the current index three. The reference patch for patch two of the current frame is reference index four. As such, the predictor for the current index three is the reference index associated with the current index two (which corresponds to the reference index four) plus one (the value from Equation (1)). Therefore, the predictor for current index three is five, since four (reference index four) plus one equals five.

After deriving the predictor index, for a patch in the current frame, the encoder 510 generates the delta patch index 638. For each patch of the current patch index 632, the delta index is the difference between the corresponding reference patch in the in the reference patches index 634 and the corresponding predictor in the predictor index 636. For example, for current index zero, the delta patch index 638 is zero since the difference between zero (the predictor of current index zero) and zero (the reference index zero which correspond to current index zero of the current frame) equals zero. For another example, the delta patch index 638 for the current index of one, is two since the difference between one (the predictor index 636 of current index one) and three (the reference index three which corresponds to current index one) equals two.

The encoder 510 then encodes the delta patch index 638. The length of the signed exponential Golomb code is reduced due to the deriving the predictor index 636 and generating the delta patch index 638. As such, the compression efficiency is increased.

The decoder 650 receives the current patch index 632 and the delta patch index 638 via the auxiliary information 526. The decoder 550 then identifies the predictor index for each patch of the current patch index 632. The predictor index for the patch of the zeroth index is set to zero. The predictor index for the patch with an index greater than zero is set to the previous patch index of the reference patch index 634 plus one, as described in Equation (1). The reference index for the patch is then identified as described in Equation (3). For example, for the patch of index zero of the current patch index 632 the delta patch index 638 is zero (as shown in row one of the table 630). The predictor for the patch zero of the current patch index 632 is set to zero, since patch zero is the zeroth patch. The decoder then derives the reference patch of the reference patch index 634 for the patch zero of the current patch index 632, based on Equation (3). The reference patch for the patch zero of the current patch index 632 for is zero (0+0=0).

Next, to identify the reference patch that corresponds to the patch one of the current patch index 632, the predictor is set to the previous reference patch of the reference patch index plus one. Since the previous reference patch index was zero, the predictor for the patch corresponding to current patch index one, of the current patch index 632, is one (zero plus one). The decoder then derives the reference patch for the patch one of the current patch index 632, based on Equation (3). Since the delta patch index 638 was received in the bitstream, the decoder identifies the delta index is two for patch one of the current patch index 632. The reference patch for patch one of the current patch index 632 three (as shown in row two of the table 630) since the predictor is one and the delta is two and one plus two yields three.

Although FIGS. 6A and 6B illustrates one example identifying the relationship between patches of a current index and a reference index various changes may be made to FIGS. 6A and 6B. For example, various steps can be overlap, occur in parallel, or occur any number of times.

Figure 7:
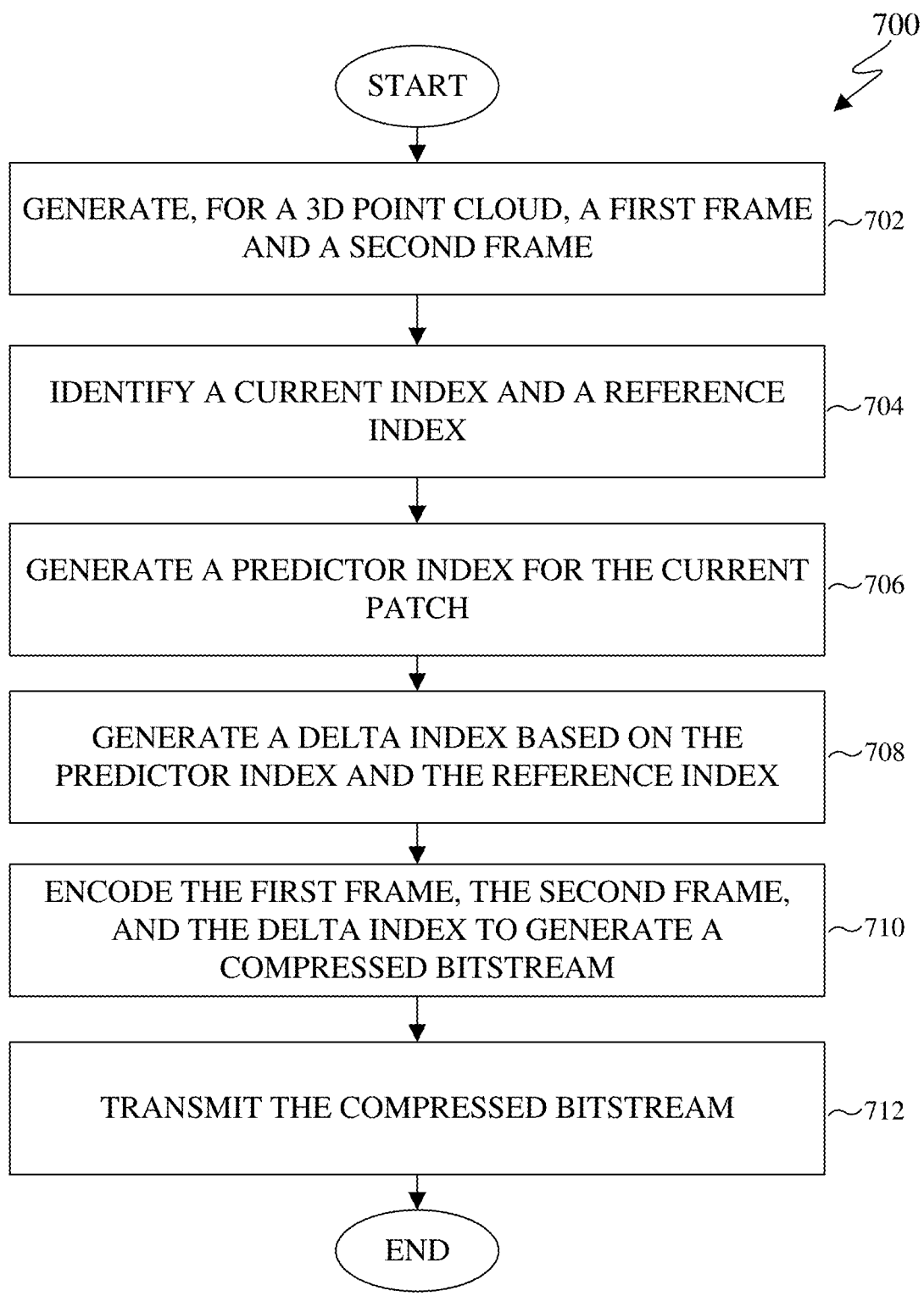
FIG. 7 illustrates example method for encoding a point cloud in accordance with an embodiment of this disclosure.

FIG. 7 illustrates example method 700 for encoding a point cloud in accordance with an embodiment of this disclosure. The method 700 can be performed by the server 104 or any of the client devices 106-116 of FIG. 1, the server 200 of FIG. 2, the electronic device 300 of FIG. 3, the encoder 510 of FIGS. 5A and 5B, or any other suitable device or system. For ease of explanation, the method 700 is described as being performed by the encoder 510 of FIGS. 5A and 5B.

In step 702, the encoder 510 generates for a 3D point cloud a first frame and a second frame. The first frame and the second frame include patches that represent clusters of points in the 3D point cloud. The first frame can be referred to as a reference frame while the second frame can be the current frame. The first frame and the second frame correspond to different instances in time. In certain embodiments, the first frame can occur at an earlier time instance than the second frame. When the frames are generated, auxiliary information such as include the height, width, position on the 2D frame, position in 3D space projection direction, and the like can also be generated to describe the patches within the frames.

In step 704, the encoder 510 identifies a current index and a reference index. The current index corresponds to a current patch in the second frame, while the reference index corresponds to a reference patch included in the first frame. The current patch matches the reference patch. Since the current patch matches the reference patch, the encoder 510 instructs the decoder to predict the auxiliary information for the current patch based on the reference index of the reference patch.

In step 706, the encoder 510 identifies a predictor index for the current patch. For example, the predictor index is used by the decoder 550 to predict which patch in the first frame matches the current patch. The predictor index for the current patch is based on a patch included in the first frame. For example, the predictor index for the current patch may be determined based on a patch included in the first frame that is matched to a previous patch in the current frame.

To generate the predictor, the encoder 510 determines whether the current index is an initial entry. The initial entry is when the current index corresponds to the zeroth patch. When the current index corresponds to patch zero of the current frame, then the predictor index is set to zero. Alternatively, when the current index is not the initial entry, the predictor index is based on the index number of another patch included in the reference frame. For example, the predictor index is based on a previous reference patch in the reference frame that matches a previous patch (i.e., has one lower index) than the current patch in the current frame. For example, the reference patch may be matched to a previous patch (i.e., has one lower index) than the current patch in the second frame. In some embodiments, the current patch and the previous patch from the current frame may point to the reference patch. In other embodiments, the predictor index may be set to the value of one plus the index of the previous reference patch that is included in the reference frame, where the previous reference patch matches the previous patch in the current frame, whose index is one less than the current patch.

For example, in some embodiments, some frames may have patches that are matched with patches in other frames (e.g., referred to as inter patches) and patches that are not matched with patches in other frames (e.g., referred to as intra patches). In certain implementations, inter patches may be together in terms of index number. In other implementations, these intra patches and inter patches may be interleaved in index order. In these embodiments, the "previous" patches in the reference and current frames may refer to a previous inter patch. In other words, the non-matched "intra" patches may not be considered when looking back to a previous patch.

In step 708, the encoder 510 generates a delta index. The delta index for the current index is based on the predictor index and the reference index. The delta index corresponds to the difference between the predictor index and the reference index. In certain embodiments, when the delta index is encoded the delta index is converted to a Golomb code In step 710, the encoder 510 encodes the first frame, the second frame, and the delta index. The encoder 510 can multiplex the frames and the delta index into a bitstream. In step 714, the encoder 510 transmits the compressed bitstream. The compressed bitstream can be ultimately transmitted to a decoder, such as the decoder 550.

Although FIG. 7 illustrates one example of a method 700 for point cloud encoding, various changes may be made to FIG. 7. For example, while shown as a series of steps, various steps in FIG. 7 could overlap, occur in parallel, or occur any number of times.

Figure 8:
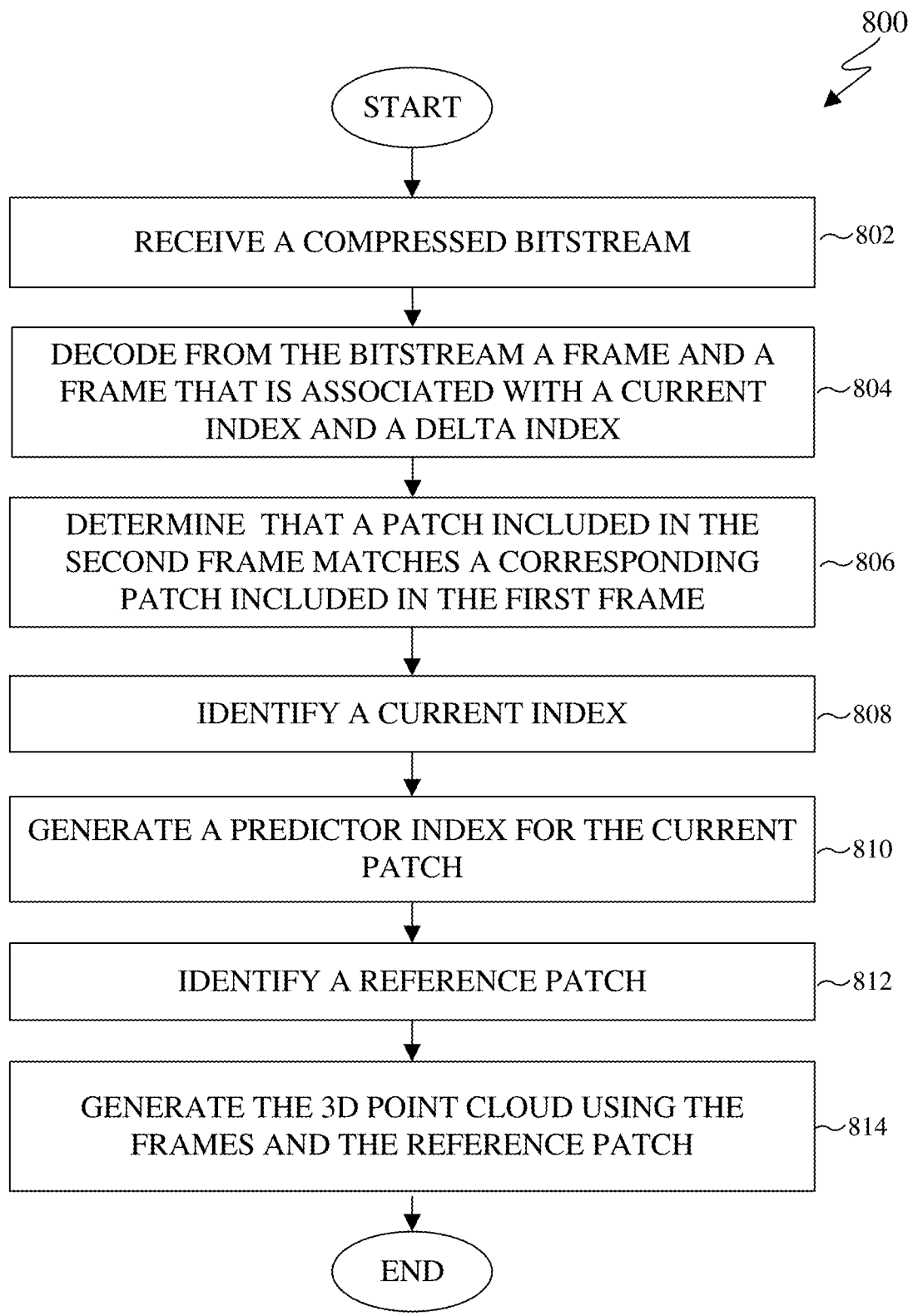
FIG. 8 illustrates example method for decoding a point cloud in accordance with an embodiment of this disclosure.

FIG. 8 illustrate example method 800 for decoding a point cloud in accordance with an embodiment of this disclosure The method 800 can be performed by the server 104 or any of the client devices 106-116 of FIG. 1, the server 200 of FIG. 2, the electronic device 300 of FIG. 3, the decoder 550 of FIGS. 5A and 5C, or any other suitable device or system. For ease of explanation, the method 800 is described as being performed by the decoder 550 of FIGS. 5A and 5C.

The method 800 begins with the decoder, such as decoder 550, receiving a compressed bitstream (step 802). The received bitstream can represent an encoded point cloud that was mapped onto multiple 2D frames, compressed, and then transmitted and ultimately received by the decoder 550.

In step 804, the decoder 550 decodes the bitstream into a first frame, a second frame that is associated with a delta index. The first frame can be referred to as a reference frame while the second frame can be the current frame. The first frame and the second frame correspond to different instances in time. In certain embodiments, the first frame is earlier in a coding order than the second frame. For example, frames may not be encoded in display order, but may advantageously be coded in an order to increase coding efficiency based on similarity between patches in respective frames of a group.

In step 806, the decoder 550 determines, based on the presence of the delta index, that at least one patch included in the second frame matches a corresponding patch included in the first frame. For example, the decoder 550 can identify that the second frame includes at least one patch that where the auxiliary information is predicted from another patch in another frame.

In step 808, the decoder 550 identifies a current index of a current patch. The current index is of a current patch included in the second frame. In step 810, the decoder 550 identifies a predictor index for the current patch. For example, the decoder 550 determines whether the current index is an initial entry. The initial entry is when the current index corresponds to the zeroth patch. When the current index corresponds to patch zero of the current frame, then the predictor index is set to zero. Alternatively, when the current index is not the initial entry, the predictor index is based on an index number of a patch included in the reference frame. For example, the predictor is based on a previous reference patch that matches a previous patch (i.e., has one lower index) than the current patch. In some embodiments, the predictor index is set to the value of one plus the index of the previous reference patch that is included in the reference frame, where the previous reference patch matches a previous patch in the current frame, whose index is one less than the current index.

In step 811, the decoder 550 identifies the reference patch. The decoder 550 identifies the reference patch by combining the predictor with the delta index. The reference patch matches the current patch. As such, the corresponding reference patch index is used to predict the auxiliary information for the current patch.

In step 810, the decoder 550 generates the 3D point cloud. For example, the decoder generates the 3D point cloud based on the first frame, the second frame, and the auxiliary information from the reference patch. When generating the 3D point cloud based on the second frame, the decoder 550 identifies the auxiliary information from the current patch index for unmatched patches, and identifies the auxiliary information for the matched patched from the reference patch as indicated by the predictor associated with each patch.

Although FIG. 8 illustrates one example of a method 800 for point cloud decoding, various changes may be made to FIG. 8. For example, while shown as a series of steps, various steps in FIG. 8 could overlap, occur in e1, or occur any number of times.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A decoding device for point cloud decoding, the decoding device comprising:
a communication interface configured to receive a compressed bitstream; and
a processor operably coupled to the communication interface, the processor configured to:
decode, from the compressed bitstream, a first frame and a second frame that is associated with a delta index, wherein the first frame and the second frame include patches that represent a three-dimensional (3D) point cloud at different instances in time;
determine, based on decoding the delta index, that at least one of the patches included in the second frame match a corresponding patch included in the first frame;
identify a current index of a current patch included in the second frame;
identify a predictor index for the current patch;
identify a reference index associated with a reference patch in the first frame based on the delta index and the predictor index, wherein the reference patch matches the current patch; and
generate the 3D point cloud using the first frame, the second frame, and the reference patch.

2. The decoding device of claim 1, wherein the processor is further configured to:
determine whether the current index is an initial entry; and
when the current index is the initial entry, assign a first value as the predictor index.

3. The decoding device of claim 2, wherein:
when the current index is not the initial entry, the processor is further configured to derive a second value as the predictor index for the current patch, and
the second value is based on an index number of a previous reference patch in the first frame that matches a previous patch in the second frame.

4. The decoding device of claim 3, wherein:
the first value is zero, and
to derive the second value, the processor is further configured to increase the index number of the previous reference patch by an integer.

5. The decoding device of claim 1, wherein:
the processor is configured to assign an index number to the patches in the second frame;
when the index number of the current patch is zero, the processor is configured to set the predictor index to zero; and
when the index number of the current patch is greater than zero, the processor is configured to inspect a previous reference index that matched a previous patch of the second frame and set the predictor index to a value that is one more than the index number of the previous reference index.

6. The decoding device of claim 1, wherein to identify the reference index, the processor is configured to:
combine the predictor index corresponding to the current index with the delta index corresponding to the current index.

7. The decoding device of claim 1, wherein to generate the 3D point cloud, the processor is configured to predict patch size information and patch location information for the current index from the reference index.

8. An encoding device for point cloud encoding, the encoding device comprising:
a processor configured to:
generate, for a three-dimensional (3D) point cloud, a first frame and a second frame that include patches representing a cluster of points of the 3D point cloud at different instances in time;
identify a current index and a reference index, the current index corresponds to a current patch included in the second frame and the reference index corresponds to a reference patch included in the first frame, wherein the current patch and the reference patch match;
identify a predictor index for the current patch;
generate a delta index based on the predictor index and the reference index; and
encode the first frame, the second frame, and the delta index to generate a compressed bitstream; and
a communication interface operably coupled to the processor, the communication interface configured to transmit the compressed bitstream.

9. The encoding device of claim 8, wherein the processor is further configured to:
determine whether the current index is an initial entry; and
when the current index is the initial entry, assign a first value as the predictor index.

10. The encoding device of claim 9, wherein:
when the current index is not the initial entry, the processor is further configured to derive a second value as the predictor index for the current patch, and
the second value is based on an index number of a previous reference patch in the first frame that matches a previous patch in the second frame.

11. The encoding device of claim 10, wherein:
the first value is zero, and
to derive the second value, the processor is further configured to increase the index number of the previous reference patch by an integer.

12. The encoding device of claim 8, wherein:
the processor is configured to assign an index number to the patches in the second frame that match the patches in the first frame;
when the index number of the current patch is zero, the processor is configured to set the predictor index to zero; and
when the index number of the current patch is greater than zero, the processor is configured to inspect a previous reference index that matched a previous patch of the second frame and set the predictor index to a value that is one more than the index number of the previous reference index.

13. The encoding device of claim 8, wherein to generate the delta index, the processor is configured to:
derive a difference value between the reference index and the prediction index.

14. The encoding device of claim 8, wherein:
to encode the delta index, the processor is further configured to convert the delta index to a Golomb code.

15. A method for point cloud decoding comprising:
receiving a compressed bitstream;
decoding, from the compressed bitstream, a first frame and a second frame that is associated with a delta index, wherein the first frame and the second frame include patches that represent a three-dimensional (3D) point cloud at different instances in time;

determining, based on decoding the delta index, that at least one of the patches included in the second frame match a corresponding patch included in the first frame;

identifying a current index of a current patch included in the second frame;

identifying a predictor index for the current patch;

identifying a reference index associated with a reference patch in the first frame based on the delta index and the predictor index, wherein the reference patch matches the current patch; and generating the 3D point cloud using the first frame, the second frame, and the reference patch.

16. The method of claim 15, further comprising:

determining whether the current index is an initial entry; and when the current index is the initial entry, assigning a first value as the predictor index.

17. The method of claim 16, further comprising:

when the current index is not the initial entry, deriving a second value as the predictor index for the current patch, wherein the second value is based on an index number of a previous reference patch in the first frame that matches a previous patch in the second frame.

18. The method of claim 17, wherein:

the first value is zero, and deriving the second value comprises increasing the index number of the previous reference patch by an integer.

19. The method of claim 15, wherein identifying the reference index comprises:

combining the predictor index corresponding to the current index with the delta index corresponding to the current index.

20. The method of claim 15, wherein generating the 3D point cloud comprises predicting patch size information and patch location information for the current index from the reference index.

* * * * *